US008255812B1

(12) United States Patent  
Parparita et al.

(10) Patent No.: US 8,255,812 B1  
(45) Date of Patent: Aug. 28, 2012

(54) EMBEDDING USER-SELECTED CONTENT FEED ITEMS IN A WEBPAGE

(75) Inventors: Mihai Parparita, New York, NY (US); Christopher Jason Wetherell, San Francisco, CA (US); Jason H. Shellen, Pleasanton, CA (US)

(73) Assignee: Google Inc., Mountain View, CA (US)

( * ) Notice: Subject to any disclaimer, the term of this patent is extended or adjusted under 35 U.S.C. 154(b) by 944 days.

(21) Appl. No.: 12/050,081

(22) Filed: Mar. 17, 2008

Related U.S. Application Data

(60) Provisional application No. 60/895,099, filed on Mar. 15, 2007.

(51) Int. Cl.
G06F 15/00 (2006.01)
G06F 13/00 (2006.01)

(52) U.S. Cl. ........................................ 715/762; 715/826

(58) Field of Classification Search .......... 715/760–765, 715/851–853, 741–780, 744–749, 826
See application file for complete search history.

(56) References Cited

U.S. PATENT DOCUMENTS

| 6,148,330 | A | 11/2000 | Puri et al. | 395/615 |
|---|---|---|---|---|
| 2002/0165881 | A1 * | 11/2002 | Shelton | 707/526 |
| 2005/0033657 | A1 * | 2/2005 | Herrington et al. | 705/26 |
| 2005/0193010 | A1 | 9/2005 | DeShan et al. | 707/104.1 |
| 2006/0173985 | A1 | 8/2006 | Moore | 709/223 |
| 2006/0230021 | A1 * | 10/2006 | Diab et al. | 707/3 |
| 2006/0279799 | A1 | 12/2006 | Goldman | 358/403 |
| 2007/0027865 | A1 * | 2/2007 | Bartz et al. | 707/5 |
| 2007/0162842 | A1 * | 7/2007 | Ambachtsheer et al. | 715/513 |
| 2007/0174487 | A1 | 7/2007 | Busey | 709/246 |
| 2008/0046459 | A1 * | 2/2008 | Hinohara | 707/102 |

OTHER PUBLICATIONS

"GettingStartedRojo," 6 pages, Nov. 27, 2005, http://web.archive.org/web/20051127084615/rojo.jot.com/GettingStartedRojo.
"Rojo's Frequently Asked Questions (FAQ)," 13 pages, Dec. 2, 2005, http://web.archive.org/web/20051202045411/rojo.jot.com/FAQ.
"Rojo Tour," 27 pages, Aug. 1, 2005, http://web.archive.org/web/20050801014123/rojo.jot.com/RojoTour.
Daily, G., "Aggregating the Aggregators RSS Reader Round-Up," EcontentMag.com, vol. 28, No. 4, Apr. 2005, pp. 38-40, WWW.ECONTENTMAG.COM.
Flickr, "Photos," downloaded Feb. 28, 2007, 13 pages, http://www.flickr.com/help/photos/?search=badge.
Kennedy, D.M., "Beating Information Overload with News Aggregators," Law Practice Management, vol. 29, No. 8, Nov. 2003, pp. 38-42.

(Continued)

*Primary Examiner* — Cao "Kevin" Nguyen

(74) *Attorney, Agent, or Firm* — Morgan, Lewis & Bockius LLP

(57) ABSTRACT

A computer-implemented method of serving content includes receiving information identifying one or more content items in a content feed. The one or more content items have been individually selected by a first user at a first client. Code is provided that, when incorporated into a webpage, instructs the webpage to display or list the selected one or more content items.

16 Claims, 23 Drawing Sheets

OTHER PUBLICATIONS

Moreover, "Creating a Custom Feed," 3 pages, Jan. 24, 2001, http://web.archive.org/web/20010124043000/w.moreover.com/dev/custom/.

Moreover, "Put FREE Headlines on Your Site—In Any Topic," 2 pages, Jan. 24, 2001, http://web.archive.org/web/20010124094700/http://w.moreover.com/site/products/webmaster/index.html.

Nottingham, N., et al., "The Atom Syndication Format," The Internet Society, Aug. 15, 2005, http://www.ietf.org/internet-drafts/draft-ieft-atompub-format-11.txt.

Sifry, D., "New Technorati Features: Favorites. and Reading Lists/OPML for Blog Finder," Sifry's Alerts, Feb. 21, 2006, 5 pages, http://www.sifry.com/alerts/archives/000423.html.

Technorati, "Add a Favorite," 3 pages, downloaded Feb. 28, 2007 http://technorati.com/faves/.

Winer, D., "RSS 2.0 Specification," Jan. 30, 2005, http://blogs.law.harvard.edu/tech/rss.

* cited by examiner

User Subscription Table 1025

| | Stream 1 1030 Feed ID: URL1 | Stream2 1032 Feed ID: URL2 | Stream3 1034 Feed ID: User1:tech | Stream4 1036 Feed ID: User2:friends | Stream5 1038 Feed ID: User25:tech |
|---|---|---|---|---|---|
| 1040 1042 User 1 | √ label:tech | √ label:tech | | | |
| User 2 | | | √ label:friends | | √ label:friends |
| User 3 1044 1046 | √ | | | √ | |
| ... | | | | | |

Figure 10D

EMBEDDING USER-SELECTED CONTENT FEED ITEMS IN A WEBPAGE

RELATED APPLICATIONS

This application claims priority to U.S. Provisional Patent Application No. 60/895,099, titled "Embedding User-Selected Content Feed Items in a Webpage," filed Mar. 15, 2007, which is incorporated herein by reference in its entirety.

TECHNICAL FIELD

The disclosed embodiments relate generally to content syndication, and more particularly, to a content feed user interface with multiple modes for viewing content feed items.

BACKGROUND

Content syndication is growing in popularity as a way to distribute frequently updated information, such as news and blog postings, on the Internet. Using content syndication formats such as Really Simple Syndication (RSS), content providers can include content and/or links to such content in a content feed. Users may subscribe to these content feeds using an application known as a feed reader, content feed reader, feed aggregator or content feed aggregator. When the content feed is updated with new content items, the new content items are reflected in the user's reader.

A user may subscribe to many content feeds, with each feed listing multiple content items. The user may desire to share some or all of these content items with other users, including other users who do not subscribe to the corresponding content feeds. The other users may desire to view the shared content items without using a feed reader application.

Accordingly, there is a need for an efficient manner of sharing content items.

SUMMARY

A computer-implemented method of serving content includes, at a server, receiving information identifying one or more content items in a content feed. The one or more content items have been individually selected by a first user at a first client. Code is provided to the first client that, when incorporated into a webpage, instructs the webpage to display or list the selected one or more content items.

A computer-implemented method of displaying content includes, at a first client, individually selecting one or more content items in a content feed; requesting code containing instructions for displaying or listing the one or more content items; receiving the requested code; and incorporating the requested code into a webpage. The requested code instructs the webpage to display or list the selected one or more content items.

A system for serving content includes memory, one or more processors, and one or more programs stored in the memory and configured for execution by the one or more processors. The one or more programs include instructions for receiving information identifying one or more content items in a content feed that have been individually selected by a first user at a first client. The one or more programs also include instructions for providing code that, when incorporated into a webpage, instructs the webpage to display or list the selected one or more content items.

A first client system for displaying content includes memory, one or more processors, and one or more programs stored in the memory and configured for execution by the one or more processors. The one or more programs include instructions for detecting individual selection of one or more content items in a content feed; instructions for requesting code containing instructions for displaying or listing the one or more content items; and instructions for receiving the requested code. The requested code, when incorporated into a webpage, instructs the webpage to display or list the selected one or more content items.

A computer readable storage medium stores one or more programs configured to be executed by a computer system. The one or more programs include instructions for receiving information identifying one or more content items in a content feed. The one or more content items have been individually selected by a first user at a first client. The one or more programs also include instructions for providing code that, when incorporated into a webpage, instructs the webpage to display or list the selected one or more content items.

A computer readable storage medium stores one or more programs configured to be executed by a computer system. The one or more programs include instructions for detecting individual selection of one or more content items in a content feed; instructions for requesting code containing instructions for displaying or listing the one or more content items; and instructions for receiving the requested code. The requested code, when incorporated into a webpage, instructs the webpage to display or list the selected one or more content items.

BRIEF DESCRIPTION OF THE DRAWINGS

FIGS. 10A-10D are diagrams illustrating data structures for feed content items and user subscriptions, in accordance with some embodiments.

DESCRIPTION OF EMBODIMENTS

In a content feed aggregation system, a user may subscribe to one or more content feeds and be presented with the content items included in those content feeds. The content items may be presented to the user in an ordered list, such that the format of each item in the list is uniform. However, the user may desire to view additional information about selected content items beyond that provided by a uniform list. The disclosed embodiments provide the user a way to view additional information about selected items. For example, in one mode of operation, when a user selects a first content item, the selected item is displayed in an expanded format, and other items are displayed in a compact format. When the user subsequently selects a second content item, the second item is displayed in the expanded format and the first item is displayed in the compact format.

A user also may desire to share content items with other users or to make content items publicly accessible. The disclosed embodiments provide ways to share content items such that other users may access the shared content items without using a feed reader user interface. For example, in one mode of operation, users may view a webpage that displays a particular user's shared content items. In another mode of operation, a particular user may incorporate code into a webpage that instructs the webpage to display one or more of the particular user's shared content items. The webpage with the incorporated code may display additional content unrelated to the shared items. Users accessing these web pages thus may view shared content items without using a feed reader user interface.

Content feeds are also herein called feed streams. The feed items from a content feed source can be considered to be a stream of items. Furthermore, some embodiments of the content feed aggregation and distribution system described herein allow users to define virtual streams that incorporate content items from content feeds and/or other virtual streams. Thus, in these embodiments, the term "feed streams" also encompasses virtual streams defined by the users of the content feed aggregation and distribution system.

Figure 1:
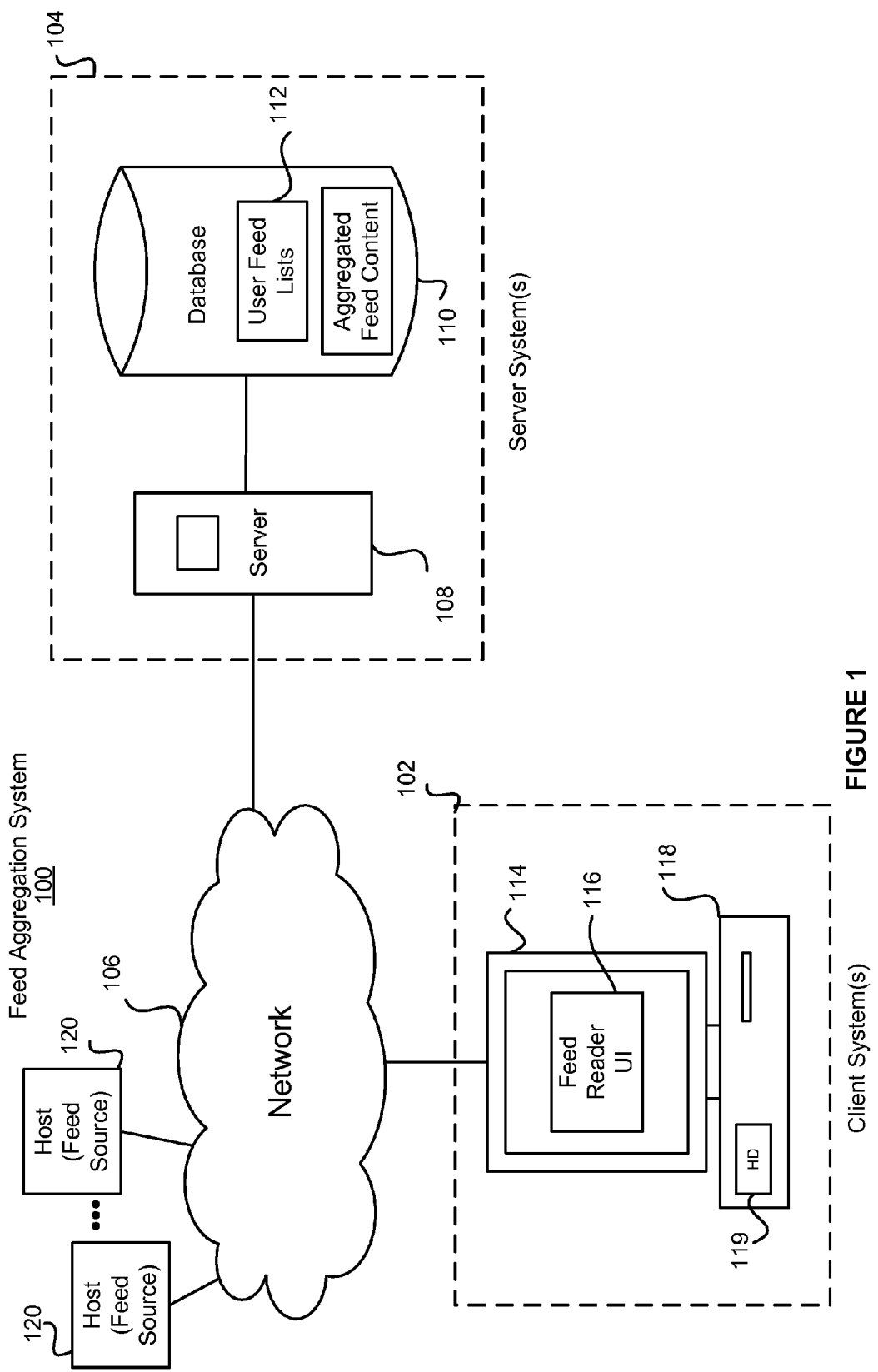
FIG. 1 is a block diagram illustrating a content feed aggregation system in accordance with some embodiments.

FIG. 1 is a block diagram illustrating a content feed aggregation system in accordance with some embodiments. The content feed aggregation system 100 includes a server system 104. The server system 104 is coupled to one or more client systems 102 and to one or more hosts 120 (or "feed sources") by a network 106. The network 106 may be any suitable wired and/or wireless network and may include a local area network (LAN), wide area network (WAN), the Internet, metropolitan area network (MAN), or any combination of such networks.

The server system 104 accesses content feeds from the feed sources 120. The server system 104 includes a server 108 and a database 110. Server 108 serves as a front-end for the server system 104. Server 108, sometimes called a front end server, retrieves the content feeds from the feed sources 120, and also provides an interface between the server system 104 and the client systems 102. In some embodiments, the functions of server 108 may be divided or allocated among two or more servers.

The server system 104 stores content items in the content feeds in the database 110. In some embodiments, the database 110 stores both metadata (e.g., title, description, URL, date/time, and possibly other metadata) and the content of each content item. However, in some other embodiments, the database 110 stores the metadata but not the content for each content item. The database 110 also stores user feed information 112 for a plurality of users. The user feed information for a particular user identifies content feed subscriptions, as well as sources, filters, read states, and additional information for that particular user. That is, user feed information associated with a user identifies the content feeds to which the user has subscribed, any filters the user has defined for the feeds, any labels the user has associated with individual feed items, and an indication of whether each feed item has been marked as "read" by the user. The user feed information also may indicate whether each feed item has been marked as "shared" by the user.

It should be appreciated that the server system 104, including the server 108 and the database 110, may be implemented as a distributed system of multiple computers. However, for convenience of explanation, the server system 104 is described below as being implemented on a single computer, which can be considered a single logical system.

A content feed (or channel) is a resource or service that provides a list of content items that are present, recently added, or recently updated at a feed source 120. A content item in a content feed may include the content associated with the item itself (the actual content that the content item specifies), a title (sometimes called a headline), and/or a description of the content, a network location or locator (e.g., URL) of the content, or any combination thereof. For example, if the content item identifies a text article, the content item may include the article itself inline, along with the title (or headline), and locator. Alternatively, a content item may include the title, description and locator, but not the article content. Thus, some content items may include the content associated with those items, while others contain links to the associated content but not the full content of the items. A content item may also include additional metadata that provides additional information about the content. For example, the content item may include an associated timestamp or date. The full version of the content may be any machine-readable data, including but not limited to web pages, images, digital audio, digital video, Portable Document Format (PDF) documents, and so forth.

In some embodiments, a content feed is specified using a content syndication format, such as RSS. RSS is an acronym that stands for "rich site summary," "RDF site summary," or "Really Simple Syndication." "RSS" may refer to any of a family of formats based on the Extensible Markup Language (XML) for specifying a content feed and content items included in the feed. In some other embodiments, other content syndication formats, such as the Atom syndication format or the VCALENDAR calendar format, may be used to specify content feeds.

Further information regarding the RSS syndication format known as "Really Simple Syndication" is disclosed in the *RSS 2.0 Specification* by D. Winer, which is hereby incorporated by reference herein in its entirety. M. Nottingham et al. disclose further information regarding the Atom syndication format in *The Atom Syndication Format*, which is hereby incorporated by reference herein in its entirety.

A user interfaces with the server system 104 and views content items at a client system or device 102 (hereinafter called the client system for ease of reference). The client system 102 includes a computer 118 or computer controlled device, such as a personal digital assistant (PDA), cellular telephone or the like. The computer 118 typically includes one or more processors (not shown); memory, which may include volatile memory (not shown) and non-volatile memory such as a hard disk drive 119; and a display 114. The computer 118 may also have input devices such as a keyboard and a mouse (not shown).

In some embodiments, a user may interact with the server system 104 via a feed reader user interface 116 that may be presented on the display 114. The user may create a list of feed subscriptions via the feed reader user interface 116. In some embodiments, using the feed reader user interface 116, the user may also create filters or labels to be applied to content feeds and/or content items, and modify the read states of content feeds and/or content items. The feed reader user interface transmits a list of content feed subscriptions, or modifications to a list of content feed subscriptions, to the server system 104 for storage at the database 110. The feed reader user interface 116 presents content items stored at the database 110 to the user based on the user's list of content feed subscriptions. That is, feed reader user interface 116 presents to the user content items specified in the content feeds to which the user has subscribed. In some embodiments, a user may view the full version of the content of a content item in the feed reader user interface 116 by selecting it (e.g., by clicking on it with a mouse pointer). In some embodiments, a copy of the user's list of content feed subscriptions and copies of the presented content items may be cached locally at the client system 102.

In some embodiments, the feed reader user interface 116 may be a web-based user interface. That is, the feed reader user interface 116 includes one or more web pages. It is noted that a single webpage can contain multiple frames, each of which may appear (when displayed by a browser application) to be a distinct webpage. The webpage(s) may be written in the Hypertext Markup Language (HTML), Extensible Markup Language (XML), or any other suitable language for preparing web pages, and may include one or more scripts for interfacing with the server system 104. For example, the webpage(s) may include a JAVASCRIPT® (a registered trademark of Sun Microsystems, Inc.) application that interfaces with the server system 104 via an application programming interface (API). The JAVASCRIPT® application receives content items from the server system 104, manages the rendering of those content items at the client, and also performs the client-side aspects of other tasks, such as marking items as read, marking items as shared, adding and removing content feed subscriptions, labeling content feed subscriptions and/or individually selected content items, selecting or revising user preferences, and the like. The user may subscribe to content feeds, view content items, and otherwise interact with the server system 104 by interacting with the webpage(s) of the feed reader user interface 116. In other words, the server system 104, including the feed reader user interface 116, provides a web-based content aggregation service. The server system 104 aggregates and stores content items in accordance with the user's content feed subscriptions. In some embodiments, the server system 104 can also apply filters or labels, or change the read states and/or shared states of content items in accordance with user actions or instructions. When the user accesses the feed reader user interface 116, the content items are presented to the user via the feed reader user interface 116.

In some other embodiments, the feed reader user interface 116 may be a part of a standalone application that is run on the client system 102. The standalone application may interface with the server system 104 via an application programming interface (API).

Figure 2A:
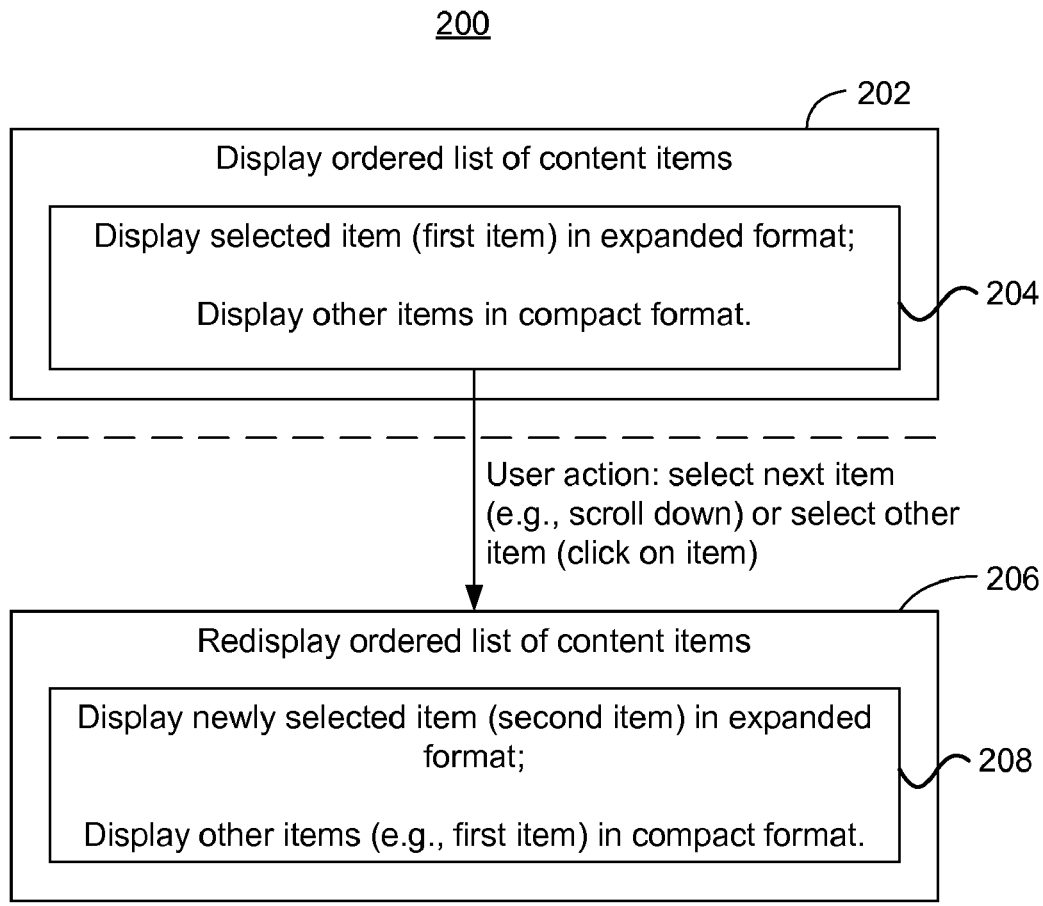
FIGS. 2A-2D are flow diagrams illustrating processes for presenting content items to a user, in accordance with some embodiments.

FIG. 2A is a flow diagram illustrating a process 200 for presenting content items to a user, in accordance with some embodiments. Process 200 occurs at a client device, on a client application that permits the user to interact with server system 104 via feed reader user interface 116. User interface 116 displays an ordered list of content items (202). The content items are specified in content feeds to which the user has subscribed. A selected first item is displayed in expanded format, and other items are displayed in compact format (204). FIG. 3B depicts an exemplary schematic screen shot of a user interface showing a first item, in an ordered list of content items, in expanded format and the other items in a compact format. In one embodiment, the compact format includes the publication source, headline, and timestamp associated with each item, with each item presented in a single line. In another embodiment, the compact format further includes a snippet (a small portion) of the content, also displayed on the single line. In an embodiment, the expanded format displays the same information as the compact format on a first line of the expanded format. In addition, the expanded format displays the title (sometimes called the headline) and source of the content on subsequent lines, in a larger font than the font used on the first line, and displays some or all of the content below the title and source. In other embodiments, the expanded format may include additional information associated with the content item. For example, a content item displayed in the expanded format may include a link to the full content associated with the content item. The link includes the URL of a webpage or other document that contains the full content of the content item.

A user may select a next item (second item), for example by scrolling down the list, or may select another item (second item), for example by clicking on it. In response, the ordered list is redisplayed (206). The newly selected second item is displayed in expanded format, while other items, such as the first item, are displayed in compact format (208). FIG. 3C depicts an exemplary schematic screen shot of a user interface showing a second item in expanded format while the first item and other items are displayed in compact format.

Figure 2B:
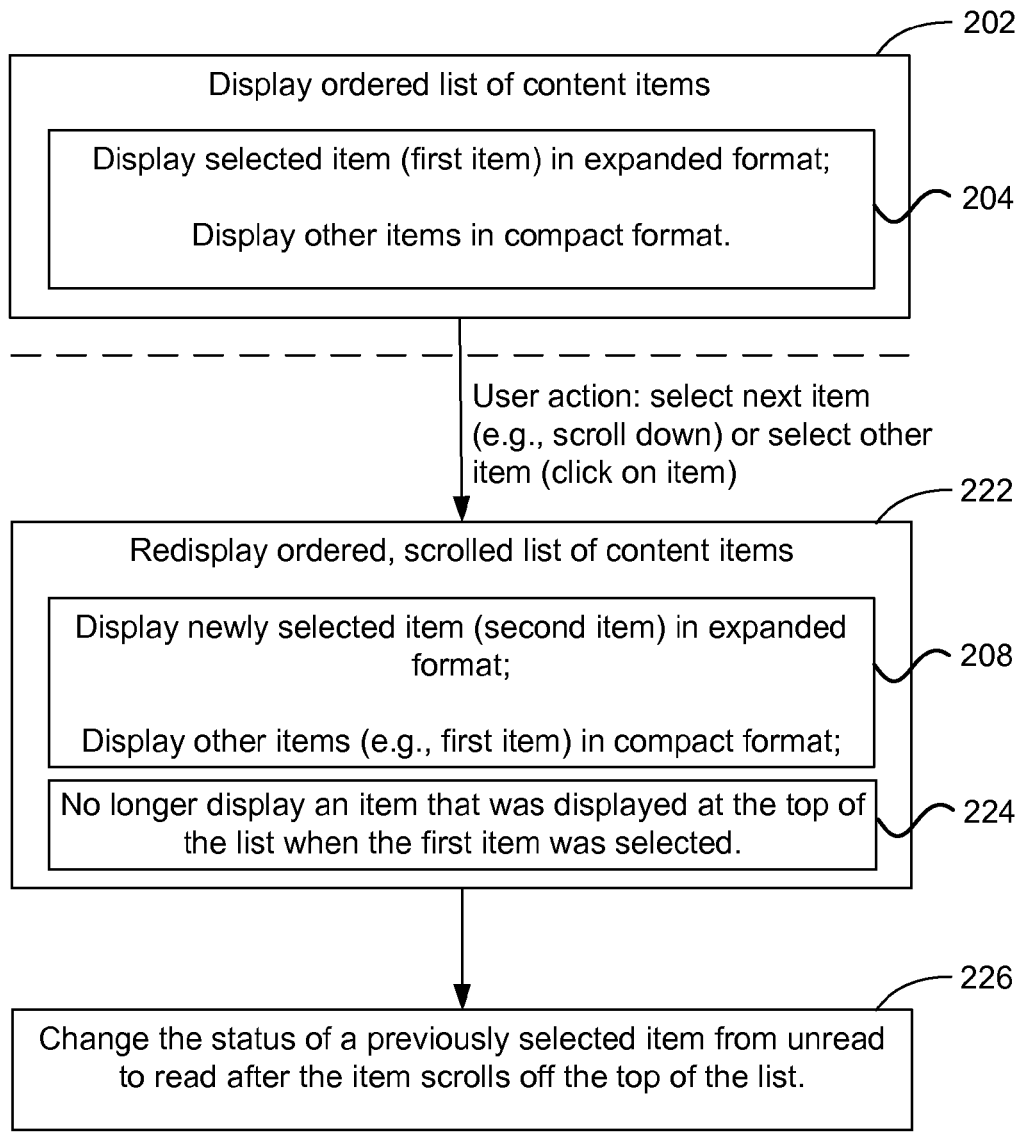

FIG. 2B is a flow diagram illustrating a process 220 for presenting content items to a user, in accordance with some embodiments. An ordered list of contents items is displayed with a selected first item in expanded format and other items in compact format, as described above (202, 204). When a user selects a second item, the ordered list is redisplayed (222). If the user has selected a second item by scrolling down the list, the redisplayed list is scrolled appropriately. The newly selected item is displayed in expanded format, while other items, such as the first item, are displayed in compact format (208). If the user has scrolled down the list, one or more items previously displayed at the top of the list when the first item was selected are no longer displayed (224). In some embodiments, the status of a previously selected item is changed from unread to read when the item scrolls off the top of the displayed list (226). More specifically, when an item that has been viewed in expanded format scrolls off the top of the display list (226), the client sends a message to the server system identifying the content item to be marked as read, and the server system then updates the status of the content item accordingly.

As discussed below with reference to FIG. 2D, in some other embodiments, content items are marked as read when they are displayed in expanded format. Alternatively, content items are marked as read when they are selected, regardless of whether they are displayed in expanded or compact format. Furthermore, in some embodiments, content items that have been marked as read, which have not yet been scrolled off the displayed list, are displayed in a manner that is distinct from the display of unread items. For example, one or more portions of the displayed text (e.g., the displayed title or headline) of items marked as read may be displayed using a light shade of gray while the corresponding text or text portions of unread items may be displayed using black text.

Figure 2C:
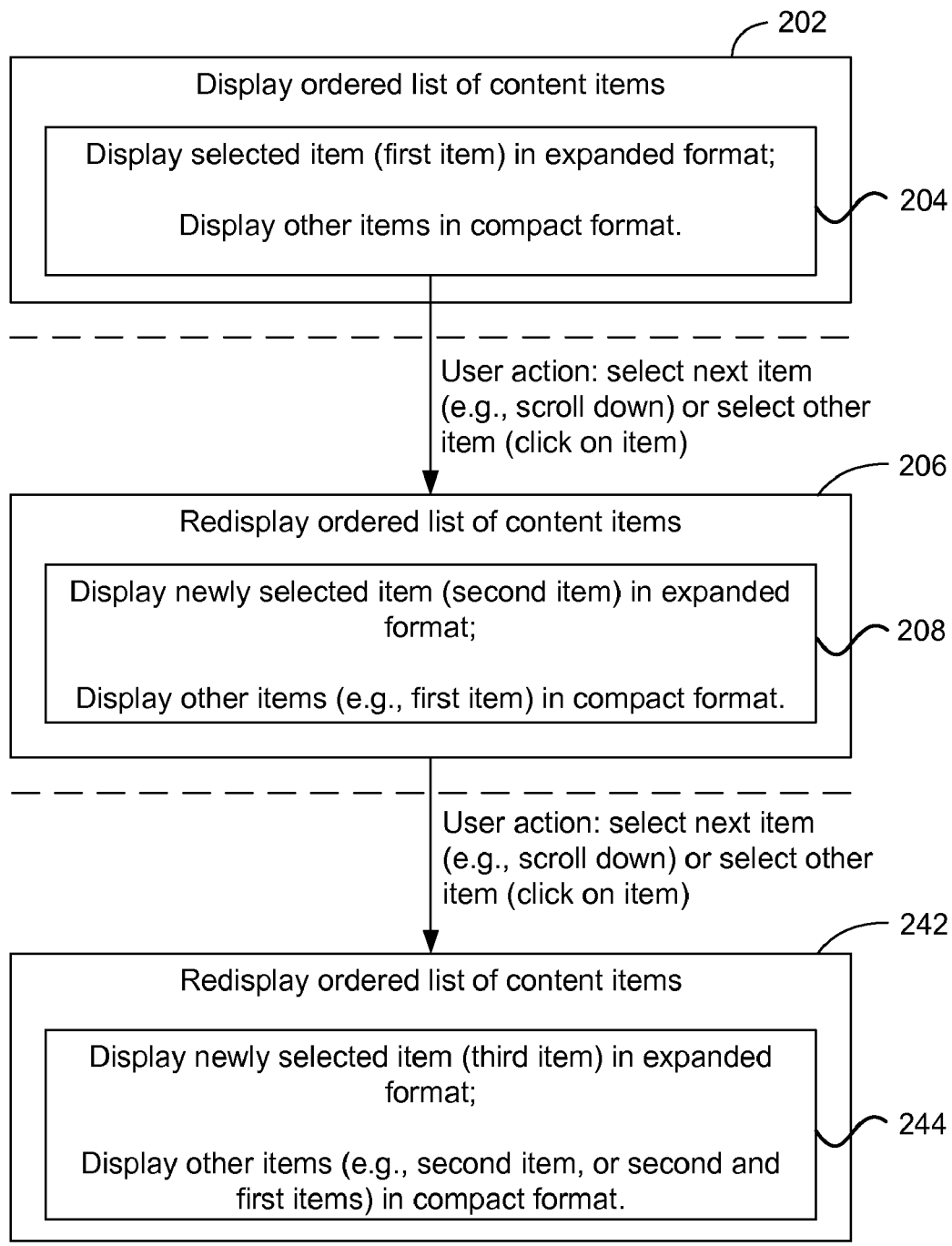

FIG. 2C is a flow diagram illustrating a process 240 for presenting content items to a user, in accordance with some embodiments. Process 240 begins with operations 202-208, described above with regards to FIG. 2A. After operation 208, the displayed ordered list includes a newly selected second item displayed in expanded format and other items, such as the previously selected first item, displayed in compact format. A user may select a next item (third item), for example by scrolling down the list, or may select another item (third item), for example by clicking on another item. In response, the ordered list is redisplayed (242). The newly selected third item is displayed in expanded format, while other items, such as the second and first items, are displayed in compact format (244). However, if the user scrolls through the list to select the third item, the first or second items may not be displayed (e.g., because they have been scrolled off the top or bottom of the displayed list of content items), depending on how far through the list the user scrolls.

Figure 2D:
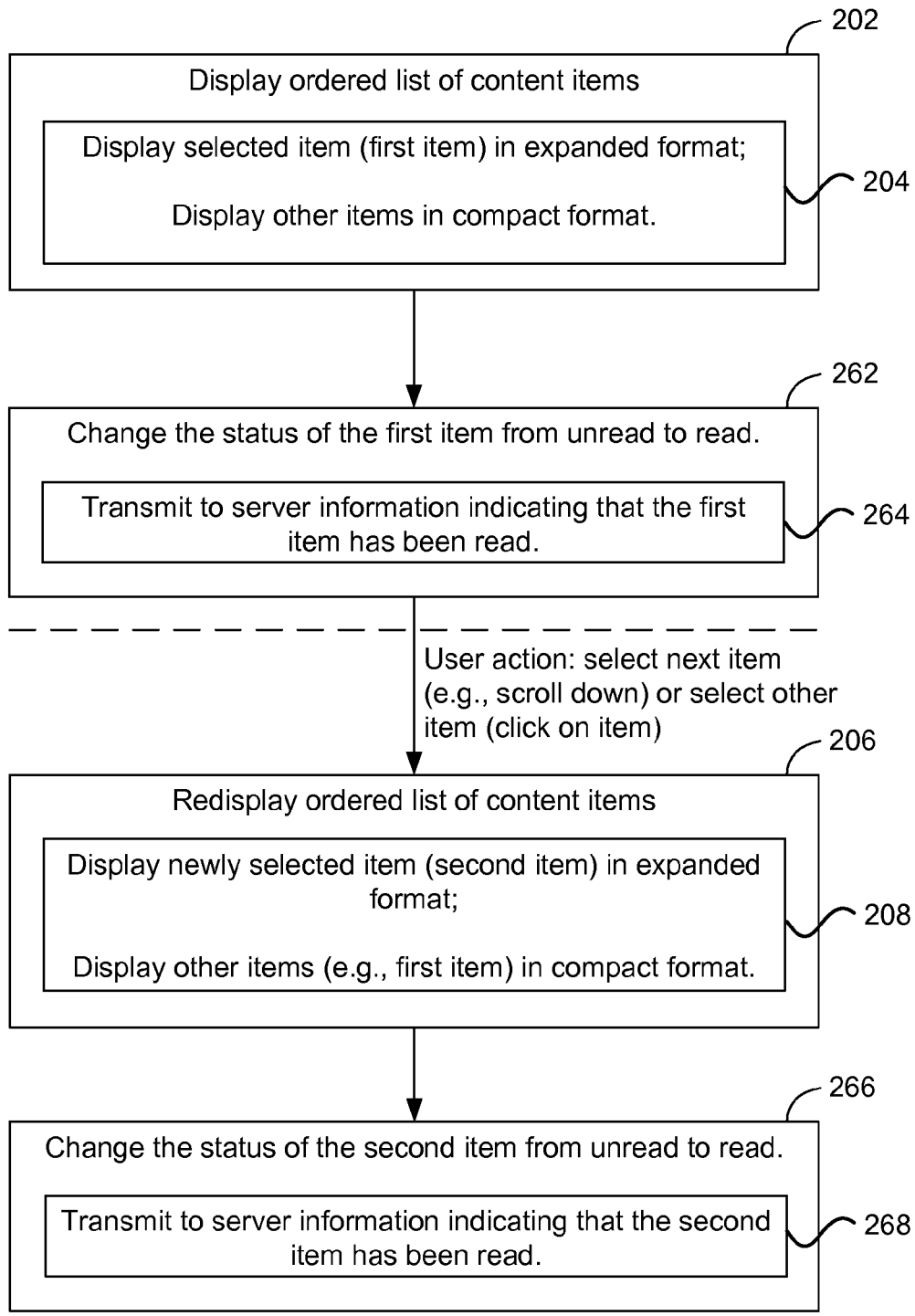

FIG. 2D is a flow diagram illustrating a process 260 for presenting content items to a user, in accordance with some embodiments. Operations 202 and 204 are performed as described above with regards to FIG. 2A. Selection of the first item results in the status of the first item being changed from unread to read (262). In one embodiment, the status is changed by transmitting information to server 108 indicating that the first item has been read (264). Server 108 then updates database 110 to reflect that the first item has been read by the user.

A user may select a next item (second item), for example by scrolling down the list, or may select another item (second item), for example by clicking on another item. In response, the ordered list is redisplayed (206). The newly selected second item is displayed in expanded format, while other items, such as the first item, are displayed in compact format (208). Selection of the second item results in the status of the second item being changed from unread to read (266). In one embodiment, the status is changed by transmitting information to server 108 indicating that the second item has been read (268). Server 108 then updates database 110 to reflect that the second item has been read by the user.

Figure 3A:
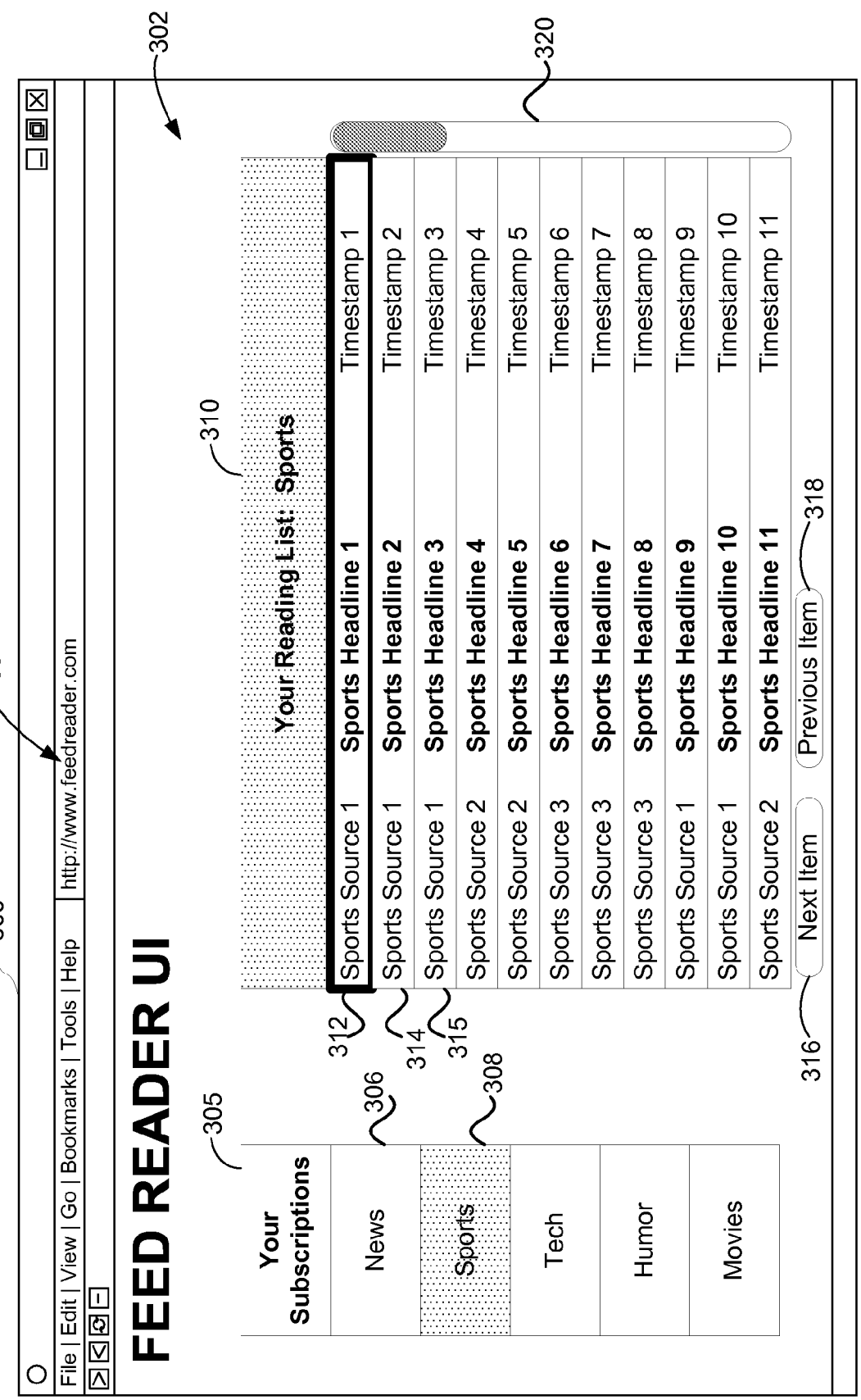
FIGS. 3A-3D are schematic screenshots of the user interface of a content feed reader in accordance with some embodiments.
Figure 3B:
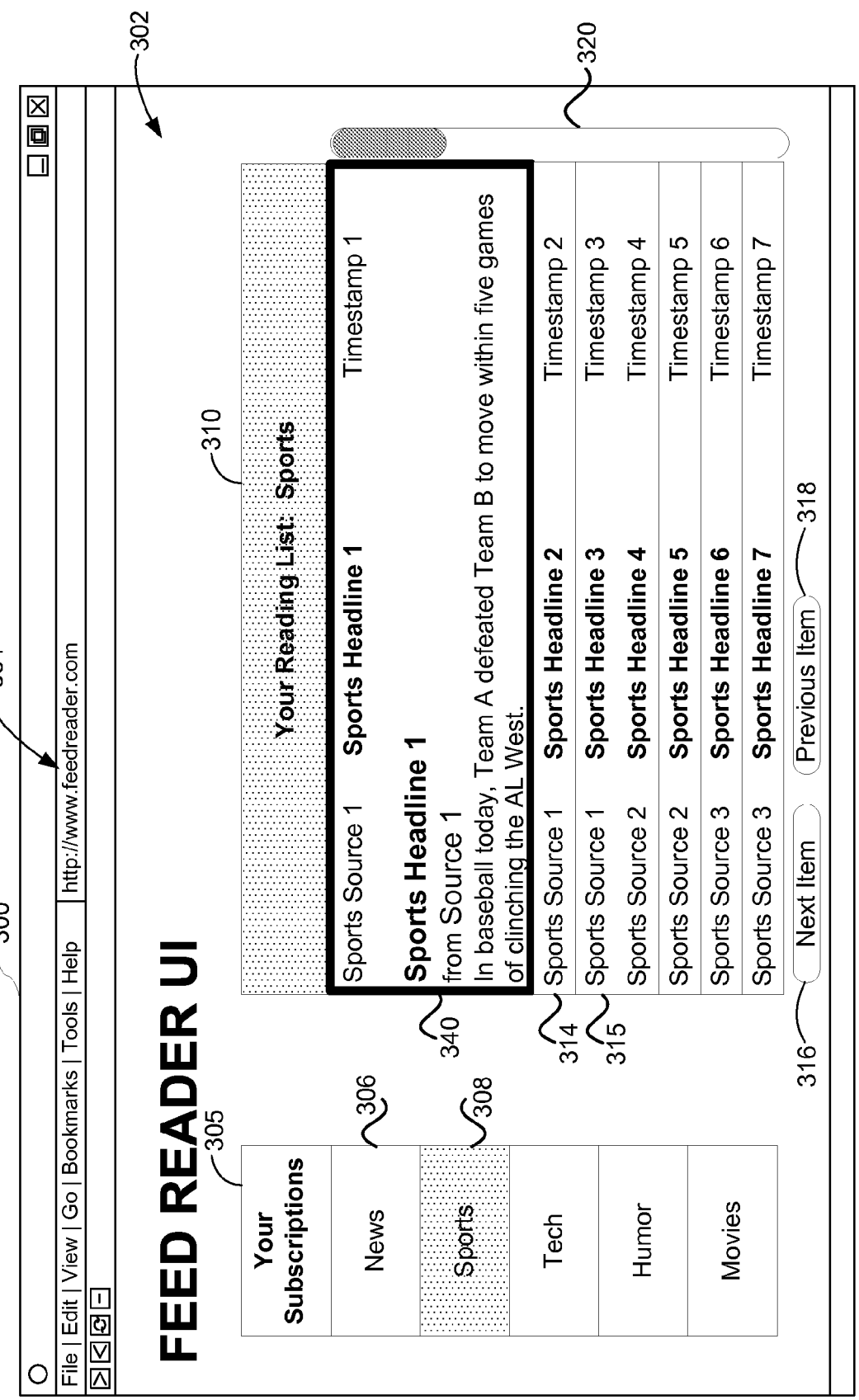
Figure 3C:
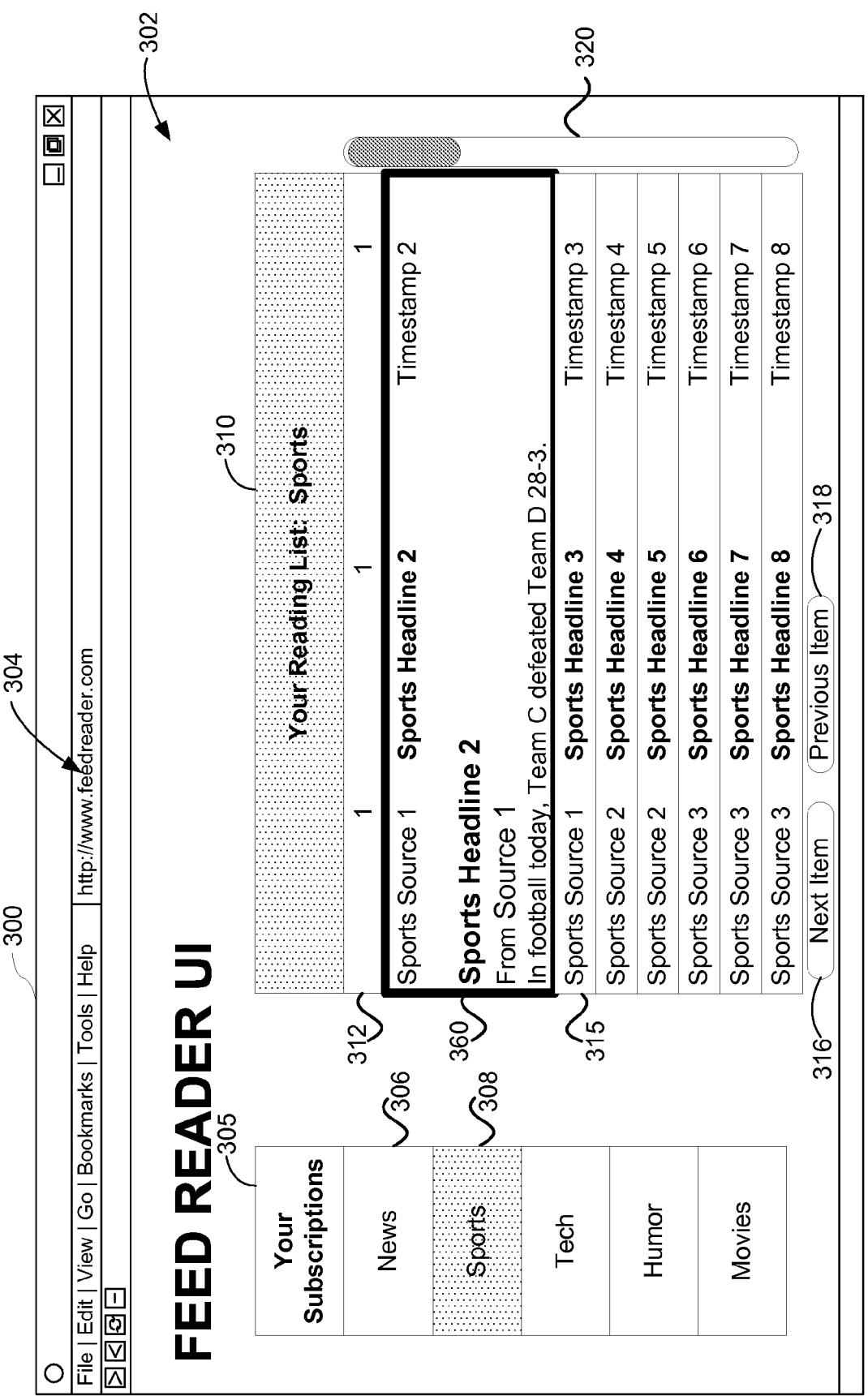

FIG. 3A is a schematic screenshot of a web browser's user interface 300 (sometimes hereinafter called the web browser for convenience), presenting a webpage that displays a feed reader user interface 302, in accordance with some embodiments. The web browser 300 can be any type of browser application that permits a user to display and interact with web pages or other documents or information. The web browser's user interface includes a URL field 304 for entering the URL of any webpage that a user wants to display, as well as for displaying the URL of the webpage currently being displayed. The user may access a webpage displaying a feed reader's user interface 302 by entering in the URL field 304 the URL associated with feed reader user interface 302.

Feed reader user interface 302 includes a list 305 of labels, also referred to as folders, associated with content feeds to which a user has subscribed. Exemplary labels shown in FIG. 3A include "News" 306 and "Sports" 308. The labels or folder names may be user defined names. User interface 302 also includes an ordered list 310 of content items associated with a selected label. For example, in FIG. 3A, the "Sports" label 308 has been selected by the user, as indicated by a shaded background. In this example, items associated with the "Sports" label, including items 312, 314, and 315, are listed in ordered list 310. In some embodiments, items in ordered list 310 are ordered according to timestamps associated with the items. In some other embodiments, items in ordered list 310 are ordered in accordance with a score that takes into account the content of the items, the source of the items, and/or the timestamps of the items.

A user may select a different label, for example by clicking on a different label. If a user selected the "News" label 306, ordered list 310 would display content items associated with "News" label 306. Also, user interface 302 would indicate that the "News" label 306 was selected by, for example, displaying it with a shaded background. In this example, the background for "Sports" label 308 would no longer be shaded after the user selected "News" label 306.

In FIG. 3A, all items in ordered list 310, including items 312, 314, and 315, are displayed in compact format. In this embodiment, compact format includes the source, headline, and timestamp for each item, displayed in a single line. For example, the compact format display for item 312 includes "Sports Source 1," "Sports Headline 1," and "Timestamp 1," all displayed on the same line of ordered list 310. In other embodiments, compact format might include additional information. For example, a brief portion of the content could be displayed next to the headline.

User interface 302 shows that an item in ordered list 310 is selected by displaying that item with a bold border. In FIG. 3A, item 312 is selected, as indicated by its bold border. Items 314 and 315 are not selected, as indicated by their narrow borders. In other embodiments, a selected item may have a border with a different color from that of other items (e.g., a thick blue border for the selected item and a gray or thin black border for the unselected items). A user may select another item (second item) by clicking on "Next Item" button 316 or "Previous Item" button 318, by clicking directly on another item, or by scrolling through ordered list 310 using scrollbar 320 and then clicking on another item. For example, in FIG. 3A, a user could select item 314 by clicking "Next Item" button 316 or by clicking directly on item 314. Item 314 then would be displayed with a bold border, and other items, such as item 312, would appear with narrow borders.

FIG. 3B is a schematic screenshot of a web browser 300 presenting a webpage that displays a feed reader user interface 302, in accordance with some embodiments. As in FIG. 3A, user interface 302 includes a list 305 of labels associated with content feeds to which a user has subscribed and an ordered list 310 of content items associated with a selected label. However, a selected content item 340 is displayed in expanded format, while other content items, such as a second item 314, are displayed in compact format. Item 340 corresponds to item 312 displayed in compact format in FIG. 3A. In an embodiment, the expanded format displays the same information as the compact format on a first line, such as the source, headline, and timestamp for each item. The headline then is displayed again in larger type on a second line, the source is displayed again on a third line, and the content or a portion thereof is displayed on a fourth and subsequent lines as necessary. This embodiment of expanded format is illustrated by content item 340. In a different embodiment, the expanded format does not display the same information as the compact format on a first line; instead, it displays the headline and source in larger type than in the compact format, followed by the content or a portion thereof on subsequent lines.

As discussed above with regard to FIG. 3A, a user may select another item (second item). For example, in FIG. 3B, the user might select item 314, by clicking on item 314 or by clicking "Next Item" button 316. FIG. 3C, a schematic screenshot of a web browser 300 presenting a webpage that displays a feed reader user interface 302, shows the result of this user action according to an embodiment. The selected item 360 (corresponding to item 314 in compact format) appears in expanded format. Other items, including first item 312 (corresponding to item 340 in expanded format) are displayed in compact format.

In the example of FIGS. 3B and 3C, item 360 is not as large as item 340: it has only one line of content as opposed to two. Therefore, the ordered list 310 in FIG. 3B displays fewer items than the ordered list 310 in FIG. 3C: ordered list 310 in FIG. 3B displays seven items, while ordered list 310 in FIG. 3C displays eight items. In general, the number of items displayed in ordered list 310 will vary depending on the size in expanded format of the selected item.

Figure 3D:
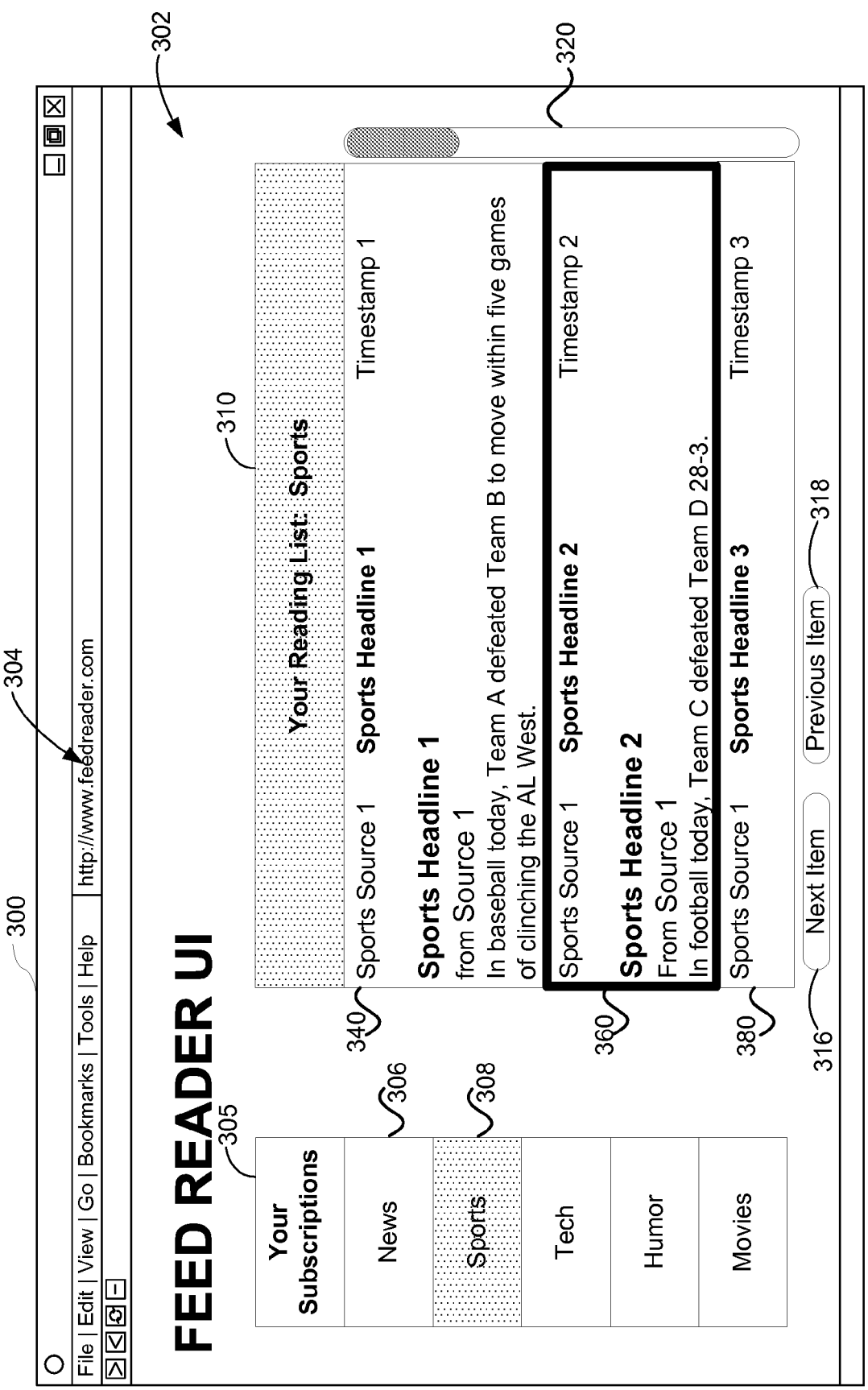

FIG. 3D is a schematic screenshot of a web browser 300 presenting a webpage that displays a feed reader user interface 302, in accordance with some embodiments. As in FIGS. 3A-3C, user interface 302 includes a list 305 of labels associated with content feeds to which a user has subscribed and an ordered list 310 of content items associated with a selected label. However, all items in ordered list 310 are displayed in expanded format. Items 340 and 360 (corresponding respectively to items 312 and 314 in compact format) are displayed in their entirety. Only the top portion of item 380 (corresponding to item 315 in compact format) is displayed, because there is not enough space to display the entire item in expanded format. Because the size of each item in expanded format varies, depending for example on the amount of content, the number of displayed items will vary in general.

Some, but not necessarily all, content items displayed in expanded format include a link to the full content associated with those content items. The link may be activated by a user clicking on the headline in the content item, or by clicking on a link icon (not shown in FIGS. 3A-3D) displayed in the expanded format of a respective content item. Activation of the link typically causes the browser to open a new browser window or tab and to download and display the document (if any) located at the location (e.g., URL) specified by the link.

Although not shown in FIGS. 3A-3D, the feed reader user interface will typically include icons, menu items or the like for reviewing and managing the user's content feed subscriptions, including removing and adding content feed subscriptions, and optionally labeling a respective content feed subscription with one or more user defined labels (or, alternately, assigning the respective content feed subscription to one or more user defined folders).

Figure 4A:
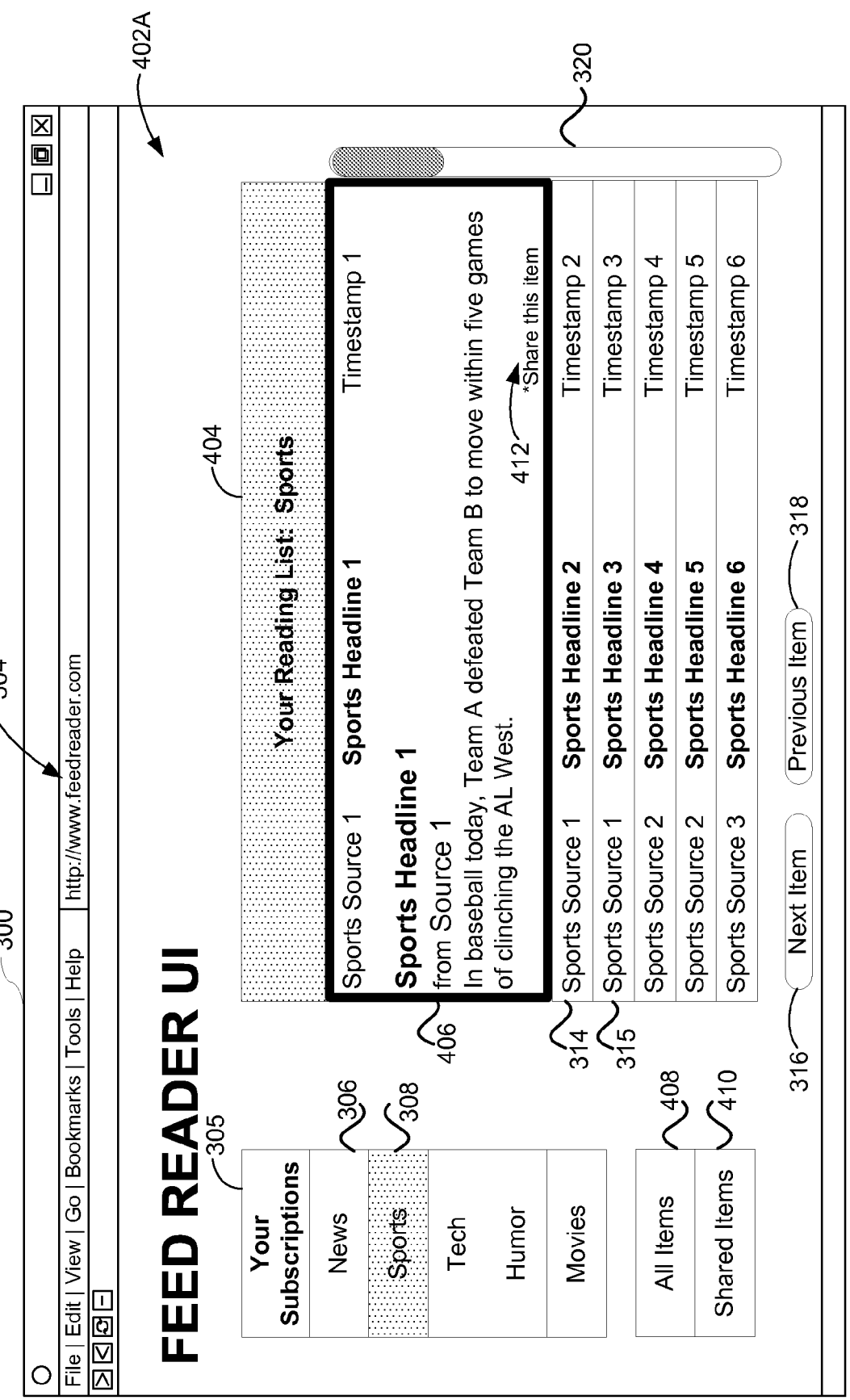
FIGS. 4A and 4B are schematic screenshots of the user interface of a content feed reader in accordance with some embodiments.
Figure 4B:
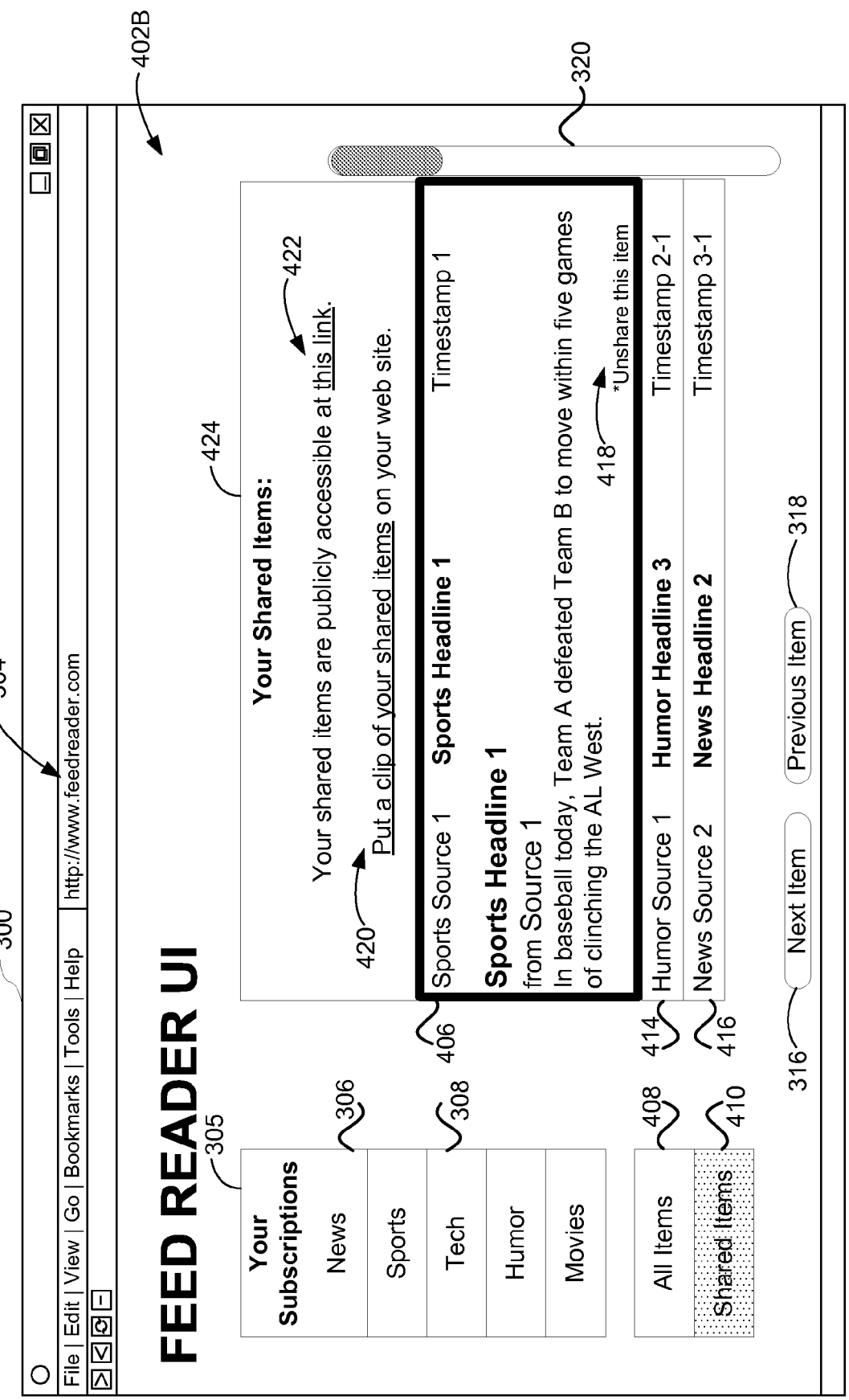

FIGS. 4A and 4B are schematic screenshots of a web browser 300 presenting web pages that display a feed reader user interface (UI), in accordance with some embodiments. User interface 402A (FIG. 4A) includes a list 305 of labels associated with content feeds to which a user has subscribed and an ordered list 404 of content items associated with a selected label. A selected content item 406 is displayed in expanded format, while other content items, such as a second item 314 and a third item 315, are displayed in compact format. In an embodiment, the expanded format for content item 406 includes the same information as for content item 340 (FIG. 3B): the source, headline, and timestamp are displayed on a first line; the headline is displayed again in larger type on a second line; the source is displayed again on a third line, and the content is displayed on a fourth and subsequent lines as necessary. Other embodiments are possible, as discussed with regard to FIG. 3B. In addition, a "share this item" icon 412 (hereinafter "share icon 412") for content item 406 is displayed. In some embodiments, share icon 412 also is displayed as part of a compact format analogous to the compact format for content items 314 and 315.

User activation of share icon 412, for example by clicking on the icon with a mouse or other pointing device, changes a status of content item 406 to indicate that the item may be shared with other users (i.e., that the item is a shared item). For example, a shared flag 1021 (FIG. 10A) associated with the content item and the user is set to indicate that the content item is a shared item. Other users may view shared items through user interfaces such as web pages 402C (FIG. 4C), 402E (FIG. 4E), or 402F (FIG. 4F).

In some embodiments, upon user activation of share icon 412 for a particular content item, share icon 412 is replaced with an "unshare this item" icon 418 (hereinafter "unshare icon 418") (FIG. 4B). Subsequent activation of unshare icon 418 changes the status of the particular content item to indicate that the item may not be shared with other users (i.e., that the item is no longer a shared item). For example, activation of unshare icon 418 would prevent other users from viewing the particular content item through user interfaces such as web pages 402C (FIG. 4C), 402E (FIG. 4E), or 402F (FIG. 4F).

In some embodiments, a user may change a status of an entire content feed or of an entire virtual stream, for example by activating a "share this feed stream" icon (not shown). In some embodiments, the virtual stream was created by the user; in some other embodiments, the virtual stream is subscribed to by the user and was created by another user. Activation of a "share this feed stream" icon changes the status of all content items in the content feed to indicate that the content items are shared items. In some embodiments, upon user activation of a "share this feed stream" icon, the icon is replaced with an "unshare this feed stream" icon. Subsequent activation of the "unshare this feed stream" icon changes the status of all content items corresponding to the content feed to indicate that they are no longer shared items.

User interface 402A also includes an "all items" icon 408 and a "shared items" icon 410. Activation of "all items" icon 408 results in display of an ordered list of content items from all content feeds to which a user subscribes (not shown). Activation of "shared items" icon 410 results in display of an ordered list (e.g., ordered list 424 in UI 402B; FIG. 4B) of shared items. For example, if a user activates share icon 412 for content item 406 and then activates "shared items" icon 410, content item 406 will be displayed in ordered list 424 of shared items. Ordered list 424 displays other shared items, such as shared items 414 and 416. In some embodiments, shared items 414 and 416 are displayed in ordered list 424 because share icons corresponding to each item previously were activated.

In some embodiments, activation of an unshare icon (e.g., icon 418) results in removal of the corresponding item from ordered list 424. For example, in response to activation of unshare icon 418, content item 406 no longer would be displayed in UI 402B.

Figure 4C:
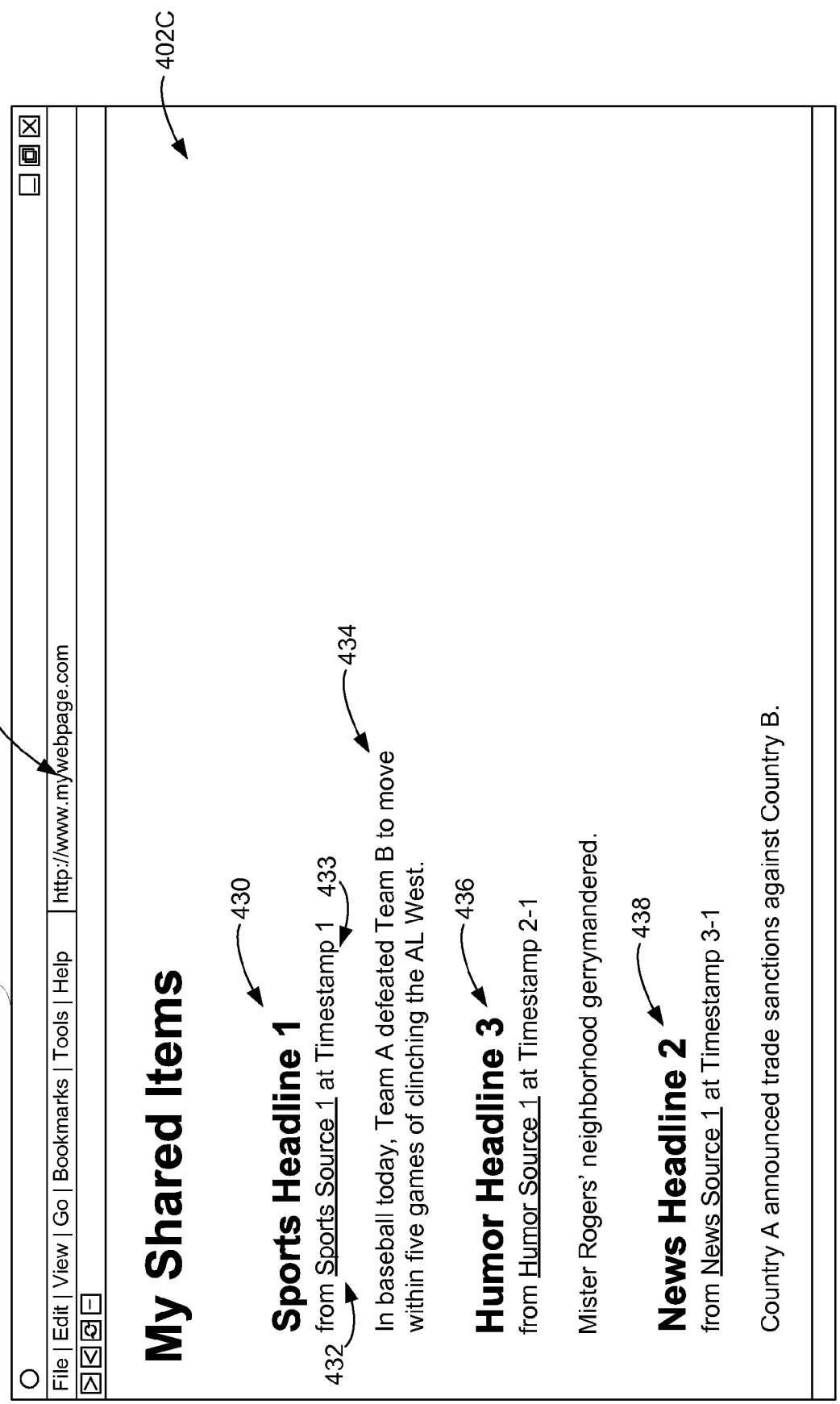
FIG. 4C is a schematic screenshot of a web browser presenting a webpage that displays a user interface for displaying a user's shared items, in accordance with some embodiments.

In some embodiments, UI 402B includes a link 422 to a webpage displaying or listing a user's shared items (e.g., webpage 402C, FIG. 4C). In some embodiments, UI 402B includes a link 420 to a clip creation webpage (e.g., webpage 402D, FIG. 4D) for enabling a user to incorporate a content feed clip into a webpage maintained by the user (e.g., webpage 402E, FIG. 4E or webpage 402F, FIG. 4F), and to thereby display or list shared content items on the webpage. The webpage into which the content feed clip is incorporated may include other content unrelated to the user's shared content items.

FIG. 4C is a schematic screenshot of a web browser 300 presenting a "My Shared Items" webpage 402C for displaying a user's shared items, in accordance with some embodiments. In some embodiments, the shared items displayed in webpage 402C correspond to the shared items listed in ordered list 424 of UI 402B (FIG. 4B): for example, headline 430 corresponds to content item 406, headline 436 corresponds to content item 414, and headline 438 corresponds to content item 416. In some embodiments, a displayed item includes a headline (e.g., 430), a source (e.g., 432), a timestamp or date (e.g., 433), and/or content (e.g., 434).

Webpage 402C is publicly accessible via a corresponding URL 426. Thus, once a user has selected one or more content items as shared items, other users may access those items by viewing webpage 402C. Because webpage 402C is independently accessible via URL 426, the other users do not need to log in to a feed reader application to access the shared items.

Webpage 402C provides a dedicated webpage for a user's shared items. However, a user may desire to display or list his or her shared items on a webpage that also contains other information. For example, a user may desire to display or list his or her shared items on a blog, on a personal homepage, or on any other webpage maintained by the user. The user may achieve this goal by incorporating a content feed clip into the webpage.

Figure 4D:
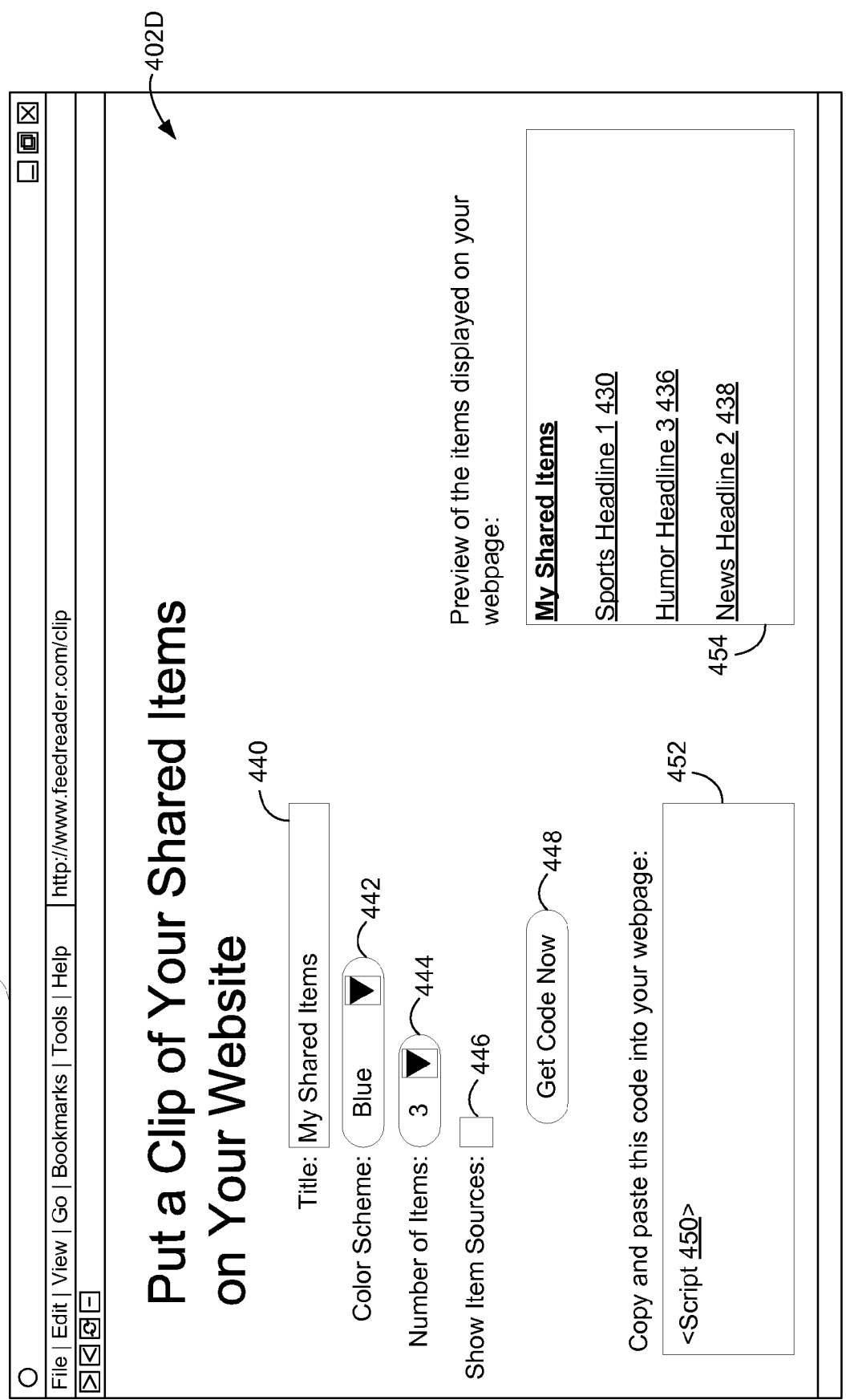
FIG. 4D is a schematic screenshot of a web browser presenting a clip creation webpage for enabling a user to incorporate a content feed clip into a webpage maintained by the user in accordance with some embodiments.

FIG. 4D is a schematic screenshot of a web browser 300 presenting a clip creation webpage 402D for enabling a user to incorporate a content feed clip into a webpage maintained by the user and to thereby display or list shared content items on the user-maintained webpage, in accordance with some embodiments. In some embodiments, clip creation webpage 402D may be accessed by activating link 420 (FIG. 4B) (e.g., by clicking on the link). In some embodiments, clip creation webpage 402D allows the user to specify details regarding the content feed clip. For example, the user may assign the clip a title using text input field 440, may specify a color in which to display the shared items using drop-down menu 442, may specify the number of shared items to be displayed using drop-down menu 444, and may specify whether to display the sources of the shared items using selection box 446. Similar user specification of other clip attributes is possible.

In some embodiments, webpage 402D provides code (e.g., script 450) that, when incorporated into a webpage, instructs the webpage to display or list the shared content items. For example, once the user has specified the relevant details regarding the content feed clip, the user may activate a "get code now" icon 448, for example by clicking on the icon. In response, script 450 is displayed in window 452. The user may copy and paste script 450 into the html code corresponding to a webpage, thereby incorporating script 450 into the webpage.

In some embodiments, script 450 is an executable script. In some embodiments, script 450 is written in the JAVASCRIPT® scripting language, ECMASCRIPT (the specification for which is published by the European Computer Manufacturers Association International), or the VBSCRIPT™ (a trademark of Microsoft, Inc.) scripting language. In some embodiments, script 450 is a two-line script: the first line points to shared code, stored on a server associated with a feed reader application, that renders clips. The second line fetches the clips to be displayed or listed and may specify information about styling the clips.

In some embodiments, webpage 402D displays a preview of the shared content items that will be displayed on the webpage into which script 450 is incorporated. For example, preview window 454 displays headlines 430, 436, and 438, corresponding to shared content items 406, 414, and 416 (FIG. 4B). In some embodiments, in addition to displaying headlines, preview window 454 may display sources, timestamps or dates, and/or content. In some embodiments, the preview of the shared content items is generated by executing the executable script. The executable script is typically executed by a virtual machine that is part of a browser application (e.g., a web browser), which in turn is executed by the client system on which the browser application is installed.

Figure 4E:
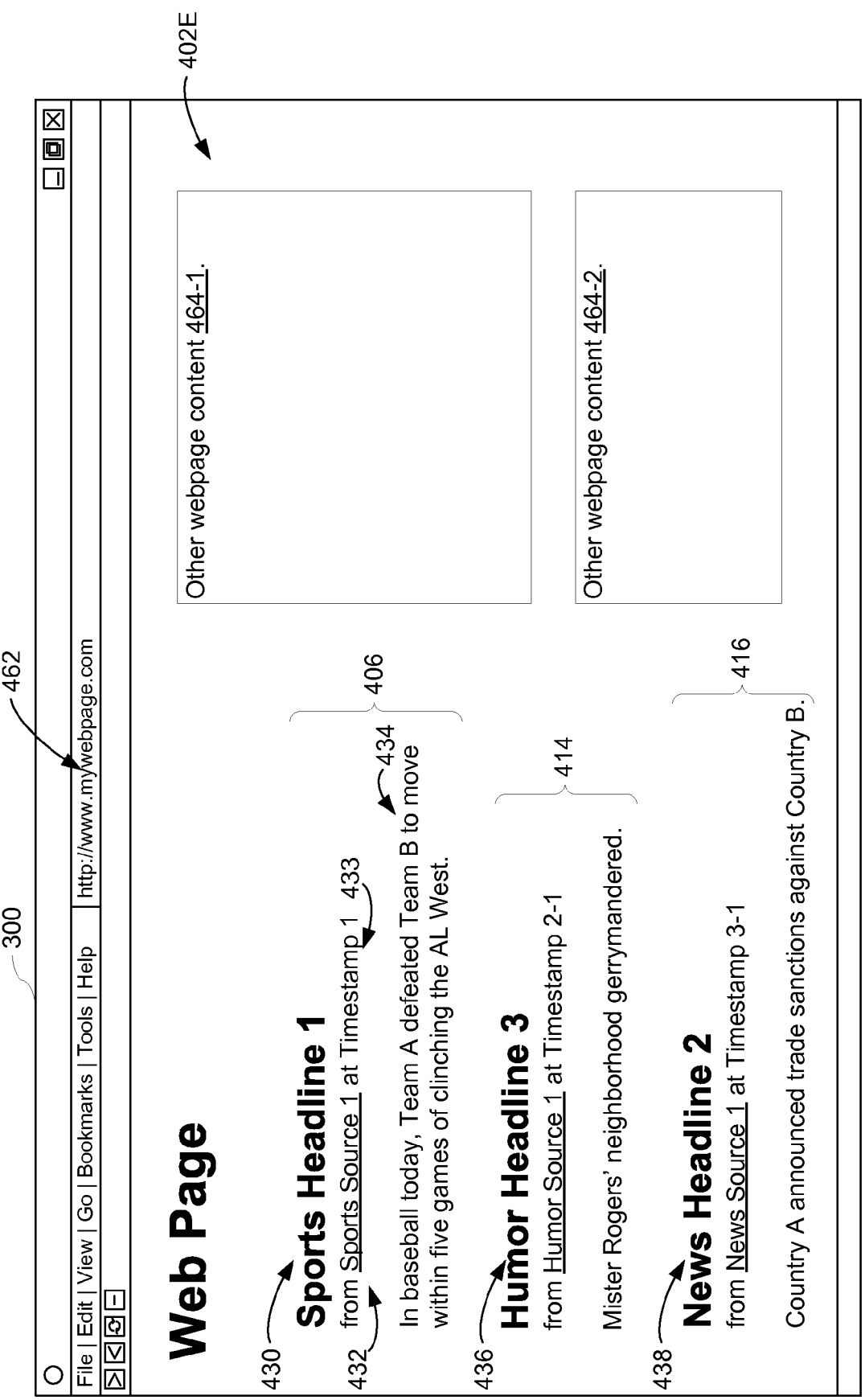
FIGS. 4E and 4F are schematic screenshots of a web browser presenting web pages that display a user's shared items as well as other webpage content, in accordance with some embodiments.
Figure 4F:
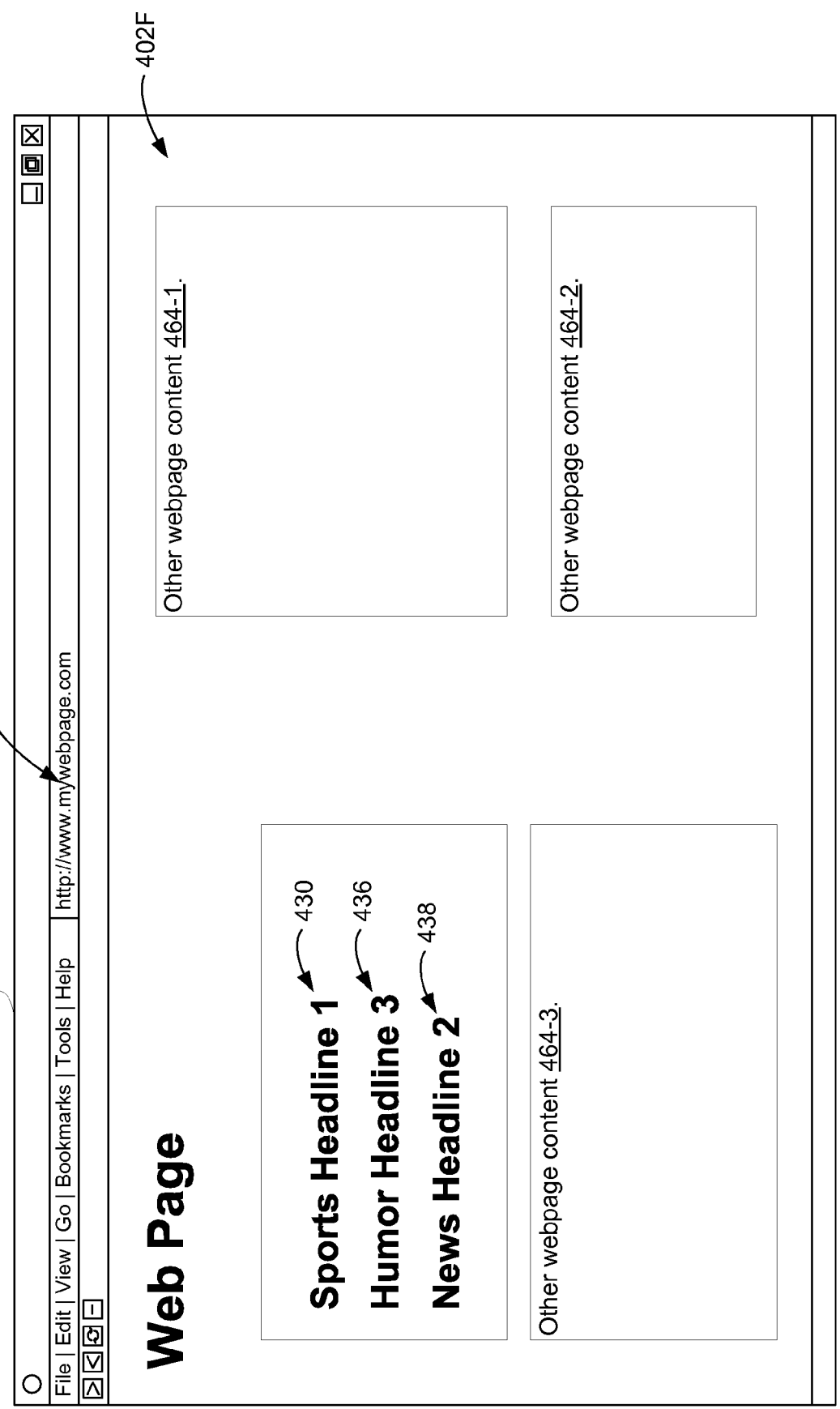

FIGS. 4E and 4F are schematic screenshots of a web browser 300 presenting web pages 402E (FIG. 4E) and 402F (FIG. 4F) that display a user's shared items as well as other webpage content, in accordance with some embodiments. Web pages 402E and 402F are publicly accessible via a corresponding URL 462. Thus, once a user has selected one or more content items as shared items and incorporated corresponding code (e.g., script 450) into webpage 402E or 402F, other users may access those items by viewing webpage 402E or 402F, without having to log in to a feed reader application to access the shared items.

In some embodiments, the webpage into which script 450 has been incorporated displays, for each displayed shared content item, a headline (e.g., 430), a source 432, a timestamp 433 or date, and/or content 434, as shown in webpage 402E. In some embodiments, the webpage into which script 450 has been incorporated lists headlines for shared content items (e.g., headlines 430, 436, and 438), as shown in webpage 402 F. In some embodiments, a user viewing webpage 402F may view a content item by clicking on a corresponding headline. In some embodiments, script 450 specifies what information corresponding to each content item is displayed.

In some embodiments, the shared content items are displayed or listed inline in the webpage, such that the items do not have a distinct appearance in the webpage. In some other embodiments, the shared content items are displayed in a distinct region in the webpage or otherwise have a distinct appearance from other content in the webpage.

In addition to displaying or listing shared content items, web pages 402E and 402F include other webpage content 464-1, 464-2, and 464-3 that may be unrelated to the shared content items.

Figure 5A:
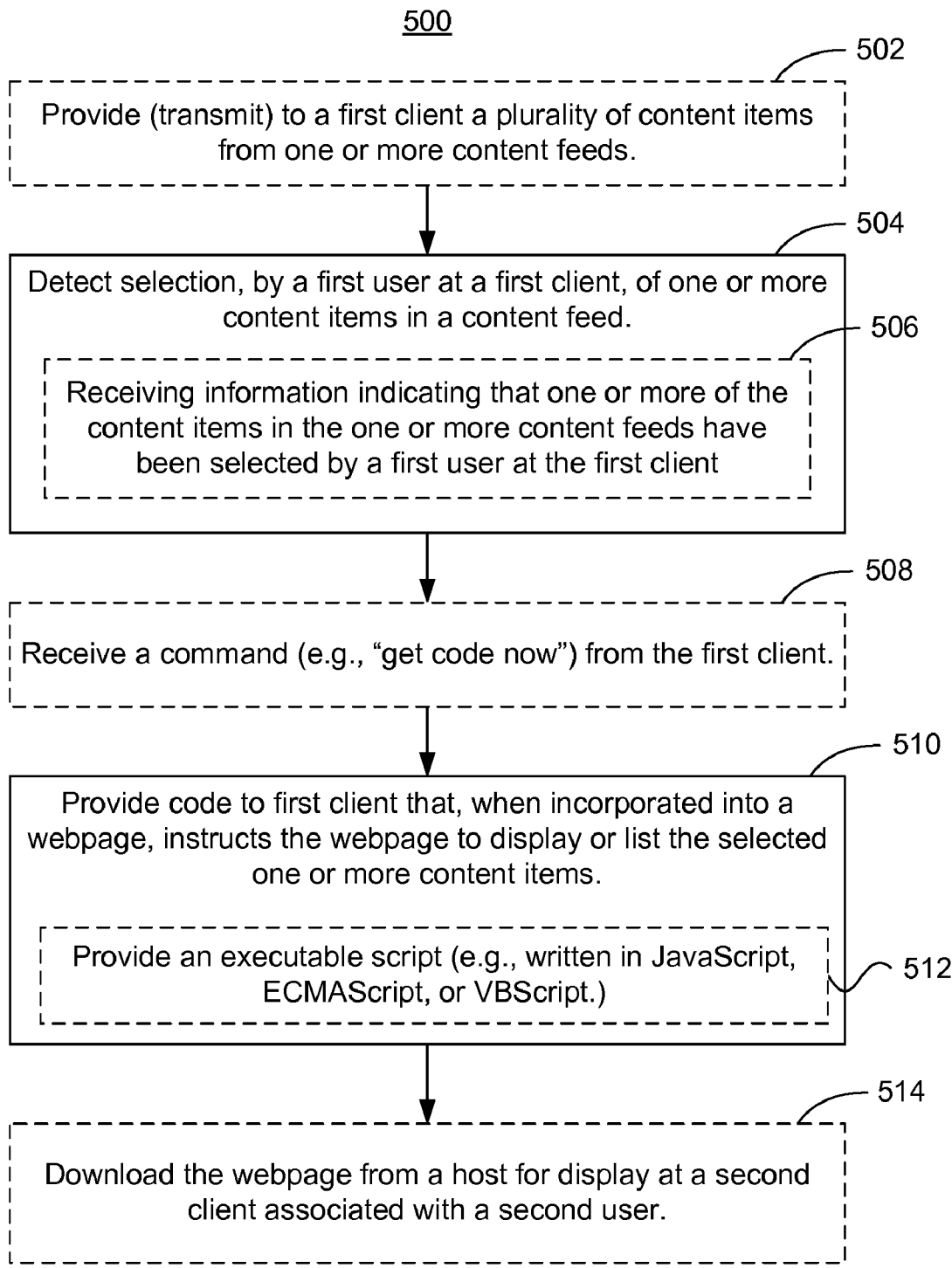
FIGS. 5A and 5B are flow diagrams illustrating processes for creating a content feed clip in accordance with some embodiments.

FIG. 5A is a flow diagram illustrating a process 500 for creating a content feed clip in accordance with some embodiments. Prior to performing the process 500, or alternately at the start of the process 500, a plurality of content items from one or more content feeds are provided (e.g., transmitted) to a first client (502). Selection by a first user at the first client of one or more content items in a content feed is detected (504). For example, in UI 402A (FIG. 4A), the first user may select one or more content items by activating the corresponding share icon(s) 412 (e.g., by clicking on the icon(s)). In some embodiments, the selected content items may include one or more content feeds selected by a user. For example, the selected content items could be a "top N" feed or a "best of" feed "produced" by a particular user, where the "top N" or "best of" feeds are the N feeds considered to be the best, the most interesting, the most relevant to a particular topic or audience, or the like.

In some embodiments, the selection of content items by the first user of the first system is detected at a server system when it receives information from the first client indicating that one or more content items in one or more content feeds have been selected by the first user (506). This information is automatically sent by the browser application to the server system when the user selects the content items by clicking on appropriately labeled links in those content items. The links contain URLs that reference the server system and parameters that identify the selected content items.

Code is provided (e.g., script 450; FIG. 4D) to the first client that, when incorporated into a webpage, instructs the webpage to display or list the selected one or more content items (510). Typically, the code is provided to the first client in response to receipt of a command (e.g., a "get code now" command) from the first client (508). In some embodiments, the command is transmitted from the first client to the server system when the first user selects or clicks on an appropriately labeled link, icon or button in the user interface (e.g., the "Get Code Now" icon 448 shown in FIG. 4D). Webpage 402E (FIG. 4E) illustrates a display of selected content items in response to instructions from the incorporated code, in accordance with some embodiments. Webpage 402F (FIG. 4F) illustrates a listing of selected content items in response to instructions from the incorporated code, in accordance with some embodiments. As described above, the selected content items may be content items individually selected by a user. In some embodiments, the selected content items may include one or more content feeds selected by a user.

In some embodiments, the provided code is an executable script (512). In some embodiments, the executable script is written in the JAVASCRIPT® scripting language, ECMASCRIPT, or the VBSCRIPT™ scripting language.

In some embodiments, the webpage is downloaded from a host for display at a second client associated with a second user (514). For example, webpage 402E or 402F would be displayed at the second client.

Figure 5B:
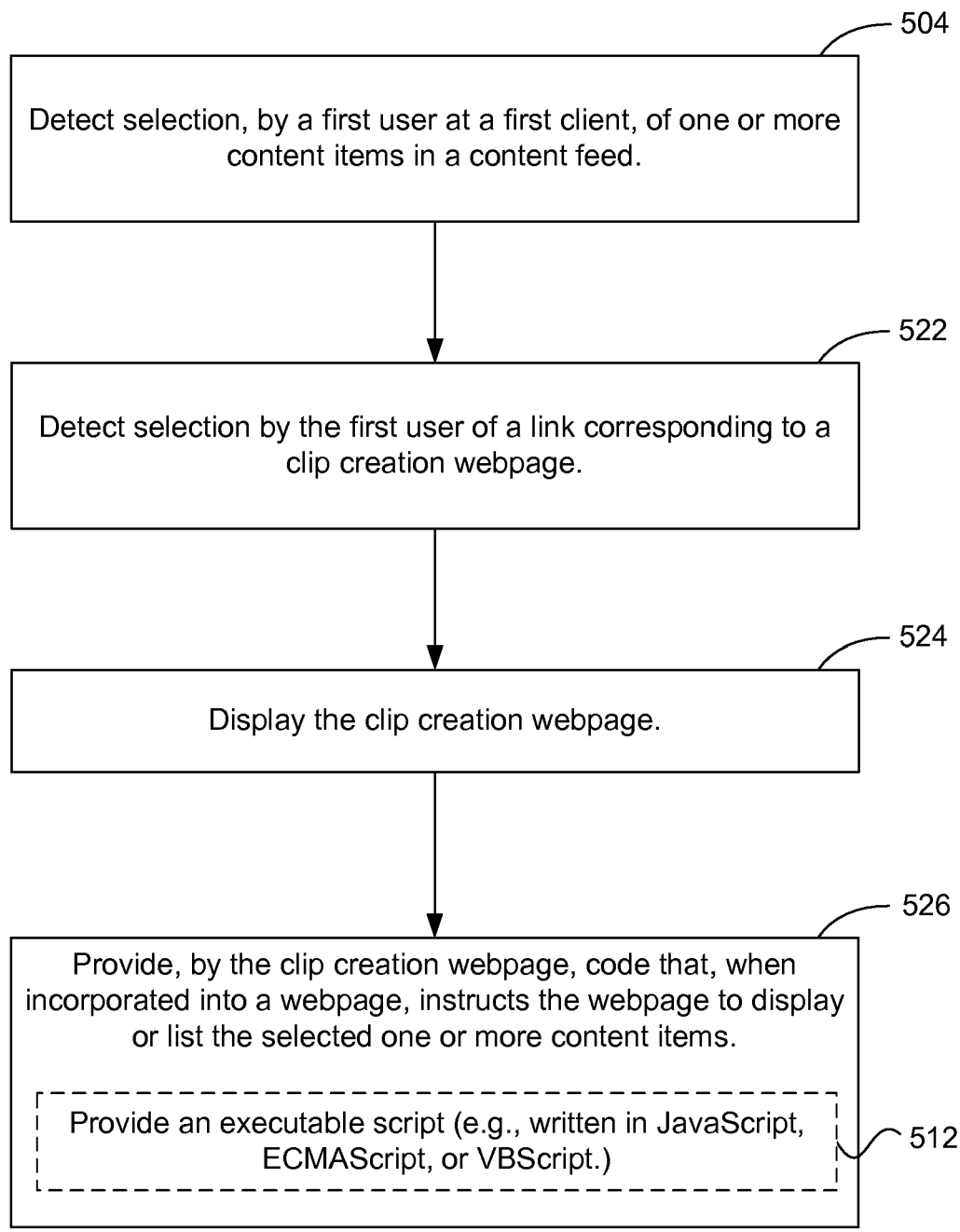

FIG. 5B is a flow diagram illustrating a process 520 for creating a content feed clip in accordance with some embodiments. Selection by a first user at a first client of one or more content items in a content feed is detected (504), as described above with regard to process 500 (FIG. 5A).

Selection by the first user of a link corresponding to a clip creation webpage is detected (522). In response, the clip creation webpage is displayed (524). For example, activation of link 420 (FIG. 4B) (e.g., by clicking on the link) results in display of clip creation webpage 402D (FIG. 4D).

The clip creation webpage provides code that, when incorporated into a webpage, instructs the webpage to display or list the selected one or more content items (526). For example, activation of "get code now" icon 448 in UI 402D results in script 450 being provided in window 452. Examples of web pages that incorporate script 450 are shown in FIGS. 4E and 4F.

In some embodiments, the provided code is an executable script (512). In some embodiments, the executable script is written in the JAVASCRIPT® scripting language, ECMASCRIPT, or the VBSCRIPT™ scripting language.

Figure 6:
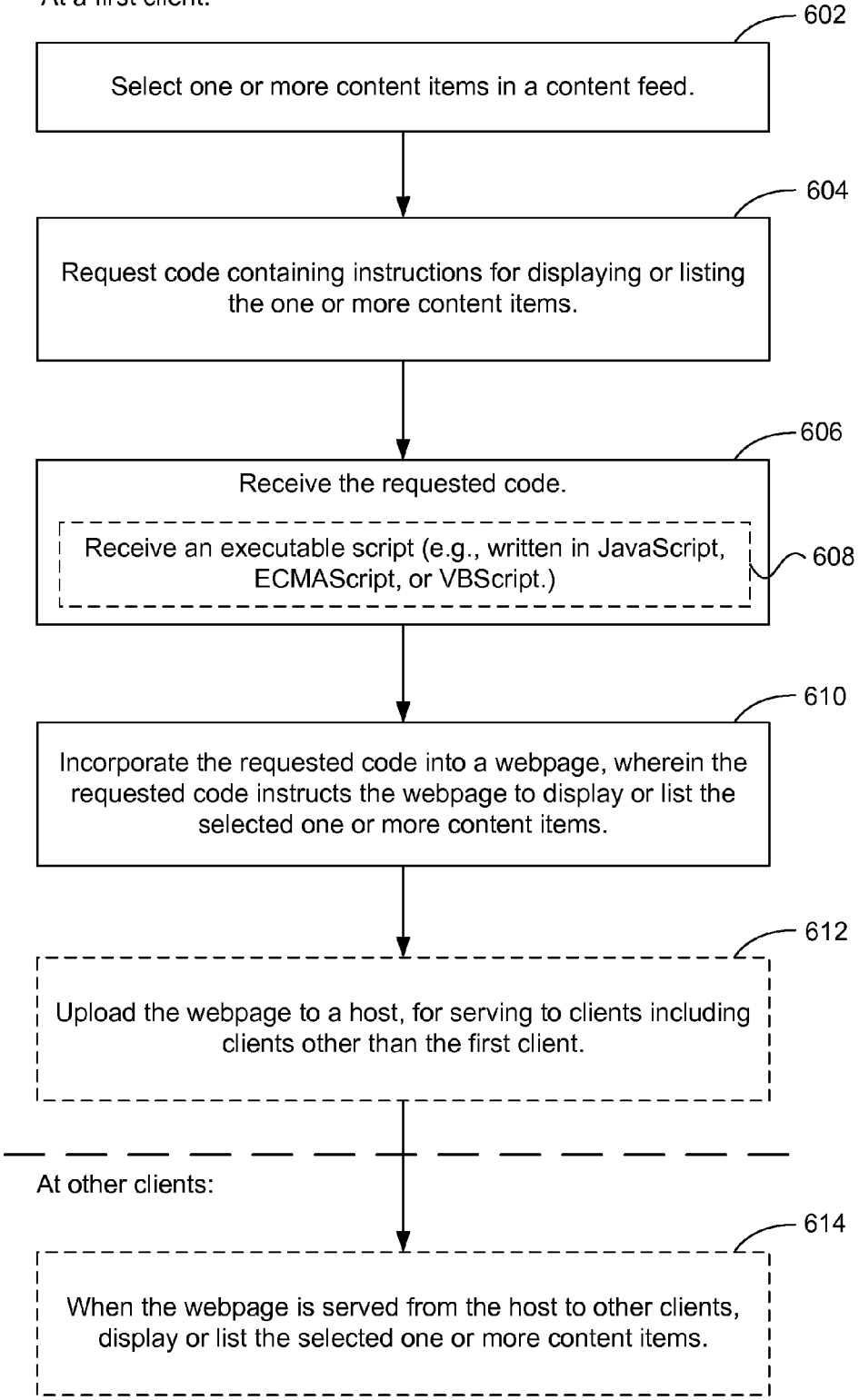
FIG. 6 is a flow diagram illustrating a process for creating a content feed clip in accordance with some embodiments.

FIG. 6 is a flow diagram illustrating a process 600 for creating a content feed clip in accordance with some embodiments. At a first client, one or more content items in a content feed are selected (602). For example, in UI 402A (FIG. 4A), one or more content items may be selected by activating the corresponding share icon(s) 412 (e.g., by clicking on the icon(s)).

Code containing instructions for displaying or listing the one or more content items is requested by the first client (604) and received at the first client (606). For example, in some embodiments, activation of link 420 (FIG. 4B) followed by activation of "get code now" icon 448 (FIG. 4D) results in generation of a request for the code. In this example, the requested code is received and displayed in window 452 (FIG. 4D).

In some embodiments, the requested code is an executable script (608). In some embodiments, the executable script is written in the JAVASCRIPT® scripting language, ECMASCRIPT, or the VBSCRIPT™ scripting language.

The requested code is incorporated into a webpage, wherein the requested code instructs the webpage to display or list the selected one or more content items (610). Examples of web pages that incorporate script 450 are shown in FIGS. 4E and 4F.

In some embodiments, the webpage with the incorporated code is uploaded to a host, for serving to clients including clients other than the first client (612). When the webpage is served from the host to other clients, the selected one or more content items are displayed or listed (614). These operations allows users other than the first user to access the webpage from their own client systems, and thus to view the selected content items.

Figure 7A:
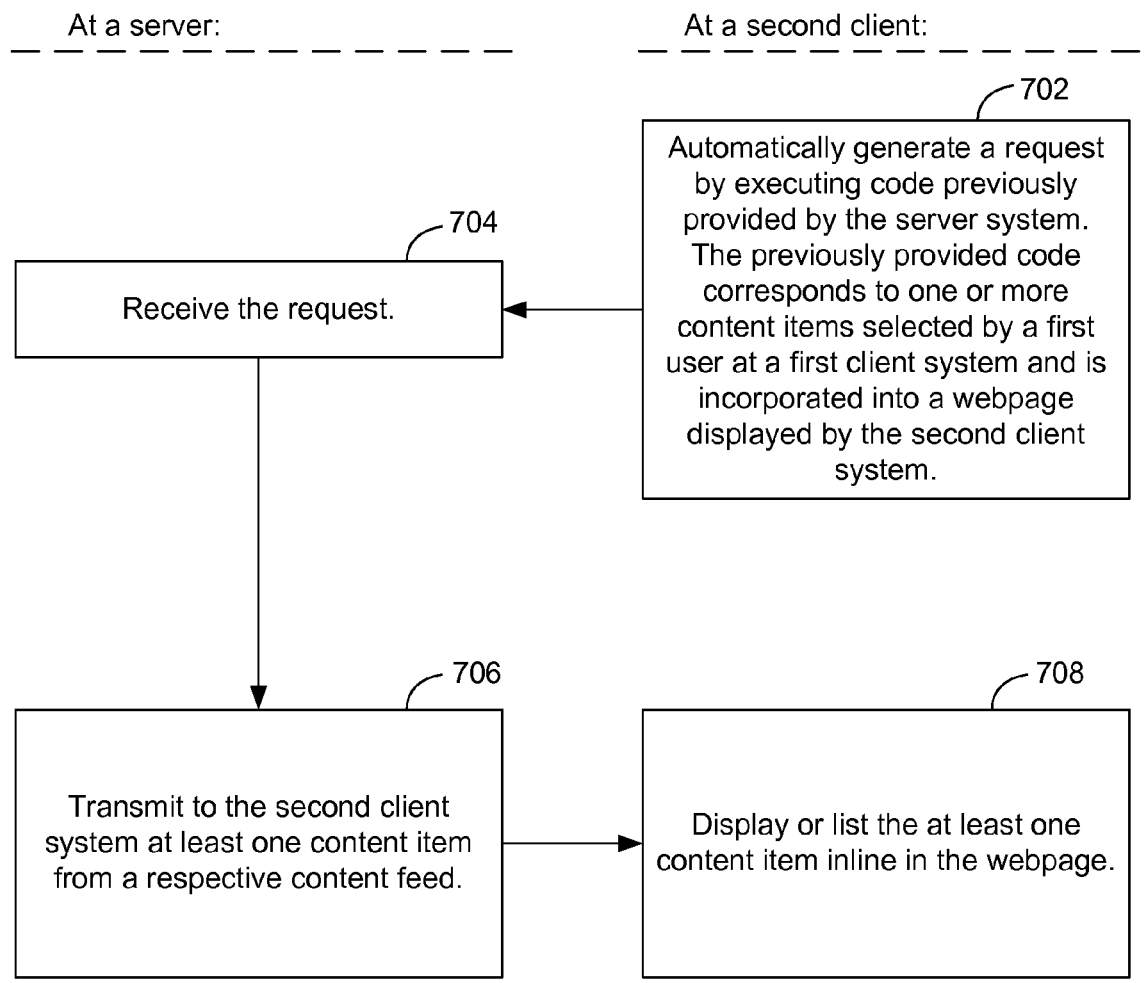
FIGS. 7A and 7B are flow diagrams illustrating processes for providing content in accordance with some embodiments.

FIG. 7A is a flow diagram illustrating a process 700 for providing content in accordance with some embodiments. A server system is remotely located from a first client system associated with a first user and from a second client system associated with a second user. At the second client system, a request is automatically generated by executing code (e.g., script 450; FIG. 4D) previously provided by the server system. The previously provided code corresponds to one or more content items (e.g., shared content items 406, 414, or 416; FIG. 4B) selected by the first user at the first client system and is incorporated into a webpage (e.g., webpage 402E; FIG. 4E or 402F; FIG. 4F) displayed by the second client system (702).

In some embodiments, the previously provided code is an executable script. In some embodiments, the executable script is written in the JAVASCRIPT® scripting language, ECMASCRIPT, or the VBSCRIPT™ scripting language. In these embodiments, the executable script is typically executed by a virtual machine that is part of a browser application (e.g., a web browser), which in turn is executed by the client system on which the browser application is installed.

The request is received at the server system (704). In response, at least one content item (e.g., shared content items 406, 414, and/or 416) from a respective content feed is transmitted to the second client (706). In some embodiments, the at least one content item is transmitted to the second client for display or listing inline in the webpage (708).

Figure 7B:
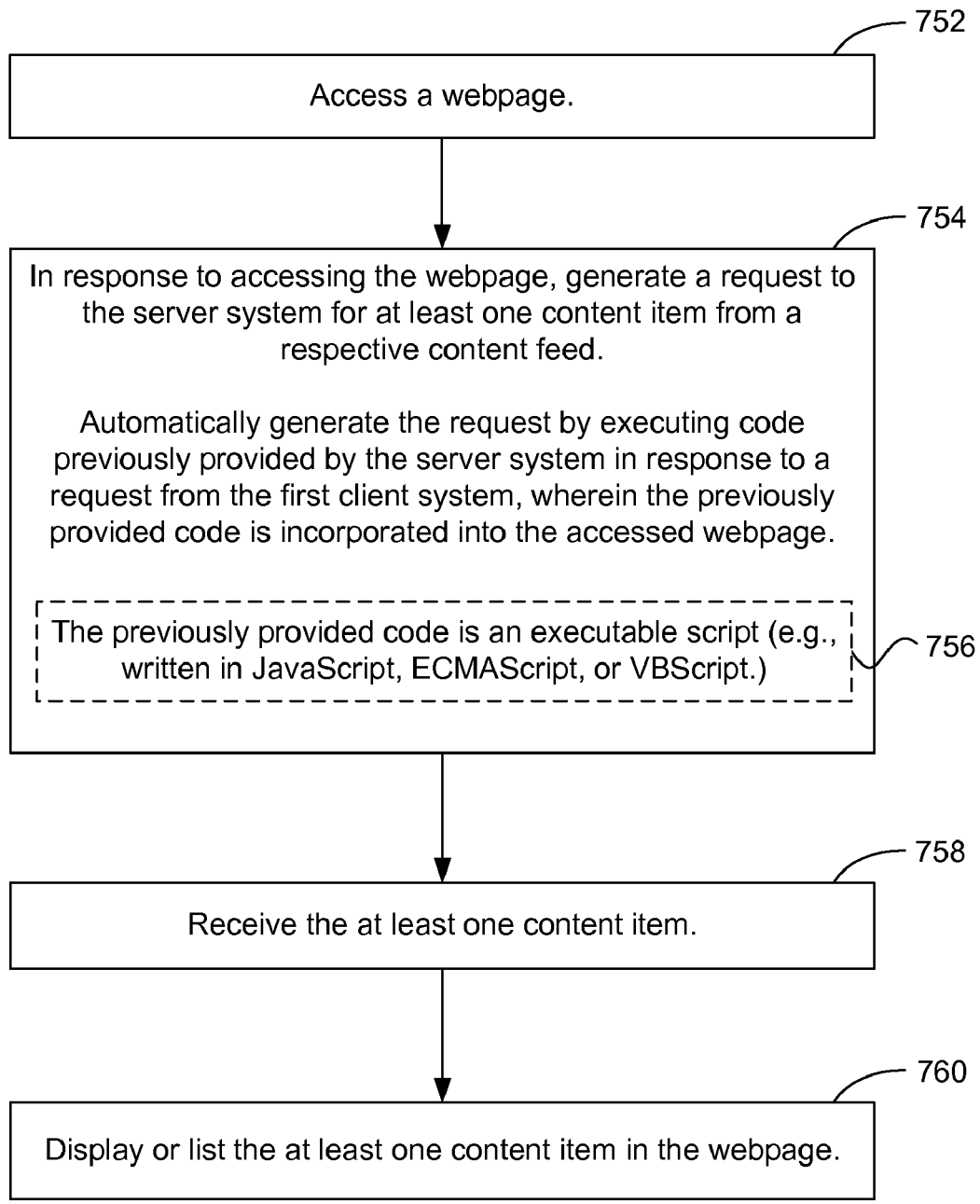

FIG. 7B is a flow diagram illustrating a process 750 for providing content in accordance with some embodiments. A second client system associated with a second user is remotely located from a server system and from a first client system associated with a first user. The second client system accesses a webpage (752). For example, the second client system may access a webpage such as webpage 402E (FIG. 4E) or webpage 402F (FIG. 4F).

In response to accessing the webpage, a request is generated at the second client system to the server system for at least one content item from a respective content feed (754). In the examples of web pages 402E and 402F, requested content items may include the shared content items corresponding to headlines 430, 436, and 438 (i.e., shared content items 406, 414, and 416; FIG. 4B). The request is automatically generated by executing code previously provided by the server system in response to a request from the first client system, wherein the previously provided code is incorporated into the accessed webpage displayed by the second client system. For example, execution of script 450 (FIG. 4D) embedded in webpage 402E or 402F results in generation of the request.

In some embodiments, such as in the example of script 450, the previously provided code is an executable script (756). In some embodiments, the executable script is written in the JAVASCRIPT® scripting language, ECMASCRIPT, or the VBSCRIPT™ scripting language.

The at least one content item is received at the second client system (758) and is displayed or listed in the webpage (760). For example, shared content items 406, 414, and 416 are displayed in webpage 402E; in another example, corresponding headlines 430, 436, and 438 are listed in webpage 402F.

Figure 8:
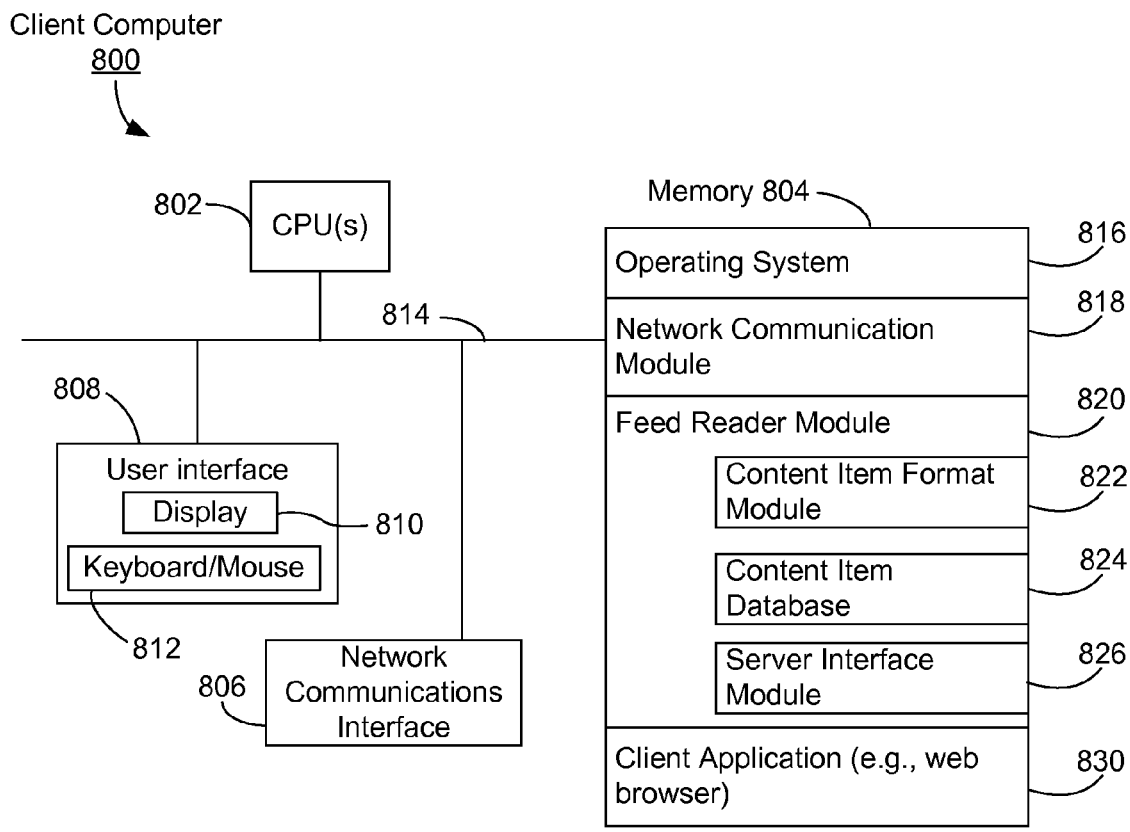
FIG. 8 is a block diagram illustrating a client computer in accordance with some embodiments.

FIG. 8 is a block diagram illustrating a client computer in accordance with some embodiments. The client computer 800 typically includes one or more processing units (CPU's) 802, one or more network or other communications interfaces 806, memory 804, and one or more communication buses 814 for interconnecting these components. The communication buses 814 may include circuitry (sometimes called a chipset) that interconnects and controls communications between system components. The client computer 800 may also include a user interface 808 comprising a display device 810 and a keyboard and/or mouse (or other pointing device) 812. Memory 804 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 804 may optionally include one or more storage devices remotely located from the CPU(s) 802. In some embodiments, memory 804 stores the following programs, modules and data structures, or a subset thereof:
- an operating system 816 that includes procedures for handling various basic system services and for performing hardware dependent tasks;
- a network communication module 818 that is used for connecting the client system 800 to other computers via the one or more communication network interfaces 806 and one or more communication networks, such as the Internet, other wide area networks, local area networks, metropolitan area networks, and so on;
- a feed reader module 820 for handling content items from content feeds; and
- a client application 830, such as a web browser.

The feed reader module 820 includes a content item format module 822 for determining the format in which to display content items, a local database 824 for storing content items sent by the server, and a server interface module 826 for interfacing with server computer 900.

In some embodiments, the feed reader module 820 may be a script-based module, embedded in a webpage served from the server system 104 (FIG. 1). The webpage may be rendered by a client application 830, such as a web browser, at the client computer 800. When the webpage is rendered, the feed reader module 820 is executed, thereby providing a web-based interface to the server system 104. The script-based feed reader module may be written in JAVASCRIPT®, ECMASCRIPT, VBSCRIPT™, or any other suitable scripting language.

In some other embodiments, the feed reader module 820 may be a standalone application stored in memory 804 of the client computer 800. The standalone application may include, but is not limited to a feed aggregator application. In further other embodiments, the feed reader module 820 may be an add-on or a plug-in to another application. For, example, the feed reader module 820 may be a plug-in or extension to a web browser application or an email application.

In some embodiments, received content items may be cached locally in memory 804. Similarly, a user's list of content feed subscriptions may also be cached locally in memory 804.

Each of the above identified elements in FIG. 8 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 804 may store a subset of the modules and data structures identified above. Furthermore, memory 804 may store additional modules and data structures not described above.

Figure 9:
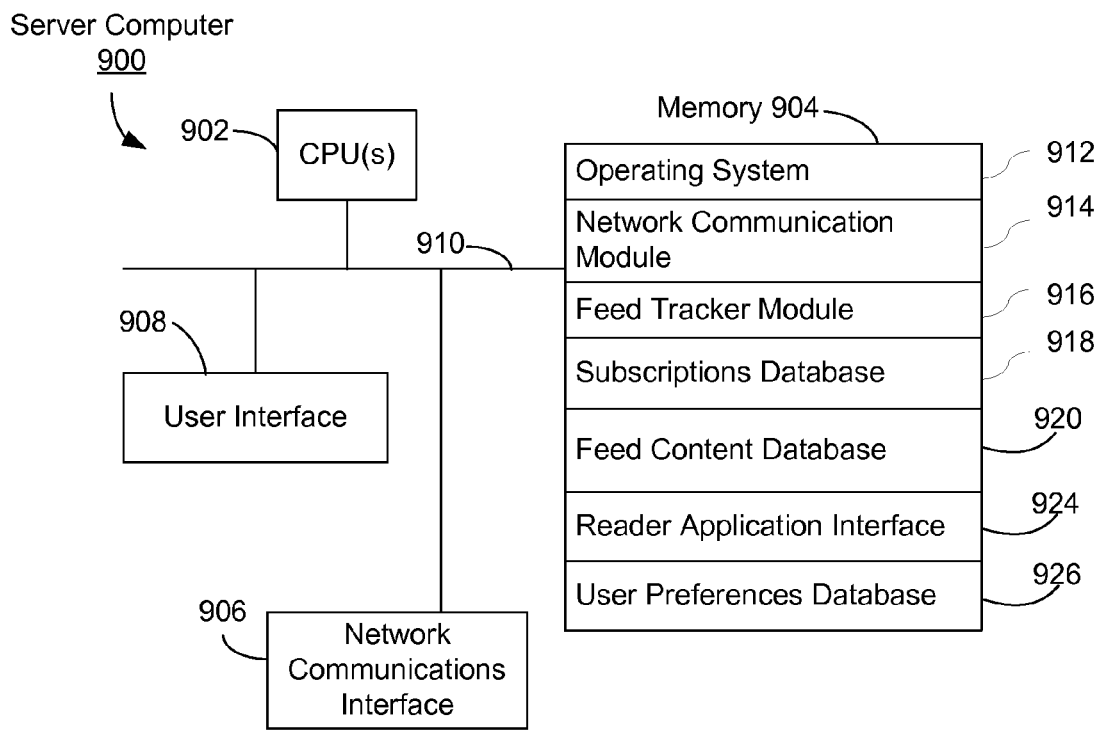
FIG. 9 is a block diagram illustrating a server computer in accordance with some embodiments.

FIG. 9 is a block diagram illustrating a server computer 900 in accordance with some embodiments. The server computer 900 typically includes one or more processing units (CPU's) 902, one or more network or other communications interfaces 906, memory 904, and one or more communication buses 910 for interconnecting these components. The communication buses 910 may include circuitry (sometimes called a chipset) that interconnects and controls communications between system components. The server system 900 optionally may include a user interface 908, which may include a display device (not shown), and a keyboard and/or a mouse (not shown). Memory 904 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 904 may optionally include one or more storage devices remotely located from the CPU(s) 902. In some embodiments, memory 904 stores the following programs, modules and data structures, or a subset thereof:
- an operating system 912 that includes procedures for handling various basic system services and for performing hardware dependent tasks;
- a network communication module 914 that is used for connecting the server system 900 to other computers via the one or more communication network interfaces 906 and one or more communication networks, such as the Internet, other wide area networks, local area networks, metropolitan area networks, and so on;
- a feed tracker module 916 for retrieving content items for storage periodically and/or as content feeds are updated;
- a subscriptions database 918 for storing information about the content feed subscriptions of users of the system;
- a feed content database 920, for storing content items from content feeds and user information about content items that respective users have read, labeled, and so on;
- a reader application interface 924 for exchanging information with the feed reader modules in one or more client computers; and
- a user preferences database 926 for storing user-specific information, including user preferences with regard to the user interface.

Each of the above identified elements in FIG. 9 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 904 may store a subset of the modules and data structures identified above. Furthermore, memory 904 may store additional modules and data structures not described above.

Although FIG. 9 shows a "server computer," FIG. 9 is intended more as a functional description of the various features which may be present in a set of servers than as a structural schematic of the embodiments described herein. In practice, and as recognized by those of ordinary skill in the art, items shown separately could be combined and some items could be separated. For example, some items shown separately in FIG. 9 could be implemented on single servers and single items could be implemented by one or more servers.

Figure 10A:
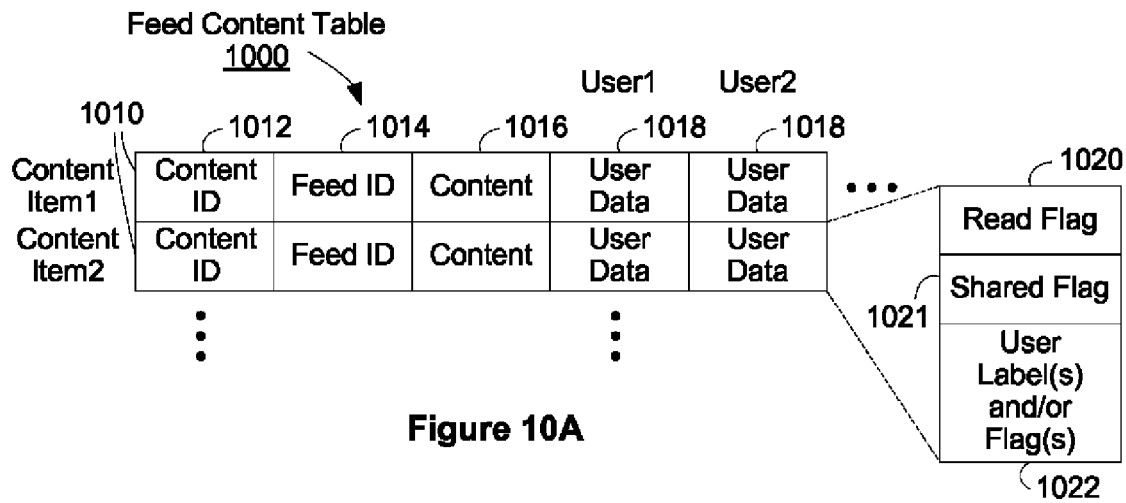

FIG. 10A is a diagram illustrating a data structure for feed content items, in accordance with some embodiments. As described above, a server computer 900 (FIG. 9) may store a plurality of feed content items in feed content database 920. The feed content items may be stored in a data structure, such as a table data structure 1000. The feed content table 1000 includes a row 1010 for each content item from each feed source. Each row includes one or more fields (1012, 1014) that identify the content item, such as a content ID 1012 and a feed ID 1014 (which identifies the feed source of the content item). In some embodiments, the content ID may include information that uniquely identifies the feed source, in which case the feed ID 1014 may be omitted. Each row 1010 may further include content 1016 of the content item. The content 1016 may include the metadata of the content item (e.g., title, description, URL, date/time, and possibly other metadata), and may further include the actual content of the content item. In addition, each row 1010 includes a column 1018 or field for each registered user of the system. The user data in this column may include a read flag 1020, which indicates whether the user corresponding to this column has read the content item associated with the row 1010 containing the user data. The user data in this column also may include a shared flag 1021, which indicates whether the user has designated the content item as a shared item. The user data in column 1018 may optionally include additional user information, such as one or more user specified labels or flags 1022. A user may tag or label content items, as well as content feeds, and a record of the tag or label that the user associated with each labeled content item is stored in the user data 1018. In some embodiments, the system may allow users to tag or label individual content items with predefined tags or labels (e.g., star, red, blue, etc.), and some embodiments further allow users to tag or label individual content items with user-defined labels (e.g., "news," "music," etc.). Furthermore, a content item, represented by a row 1010, may by tagged by any number of users.

Figure 10B:
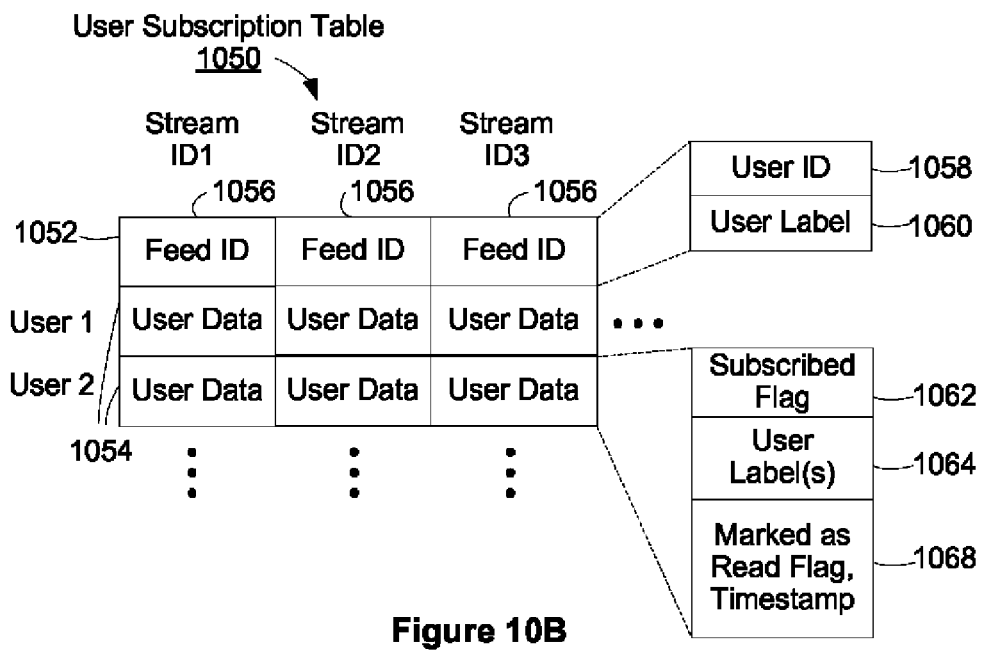

FIG. 10B is a diagram illustrating a data structure for user subscriptions, in accordance with some embodiments. As described above, a server computer 900 (FIG. 9) may store user subscription information in subscriptions database 918. The user subscription information may be stored in a data structure, such as a table data structure 1050. A user subscription information table 1050 stores feed identifications for feed streams known to the system and user data for those feed streams. The user subscription table 1050 includes fields or columns 1056 corresponding to the stream ID's for each content stream known to the system, including both real content streams (typically corresponding to content streams from publication sources at well defined network locations) and virtual content streams. A virtual content stream is a content stream derived from one or more other content streams within the context of the server system 104. For example, a virtual content stream may include a set of real content streams assigned a label by a user. In another example, a virtual stream may include individual content items assigned a particular label by a user; the labeled content items may be from one or more real content streams. In one embodiment, a virtual stream can be identified by the user who created the stream and the user label assigned to the virtual stream by the user. Thus, the stream ID of a virtual stream may include the user ID 1058 of the user who created the virtual stream and the user label 1060 assigned to the virtual stream by that user. Alternately, the stream ID of a virtual stream may be generated or assigned by a mapping function that maps virtual streams to virtual stream IDs.

Table 1050 further includes a row 1054 for each user, with fields or columns 1056 containing user data for each content stream. In some embodiments, the user data for a respective content stream includes a subscribed flag 1062 indicating whether the user has subscribed to the content stream associated with the column 1056 containing the user data. The user data may also include a marked-as-read flag and timestamp 1068, which indicates whether and when the user corresponding to the row has viewed the items in the content stream associated with the column 1056. The user data may further include additional user information, such as one or more user specified labels 1064. A user may label content streams that the user may want to view again in the future, and a record of the label that the user associated with a content stream may be stored in the user data 1056.

Figure 10C:
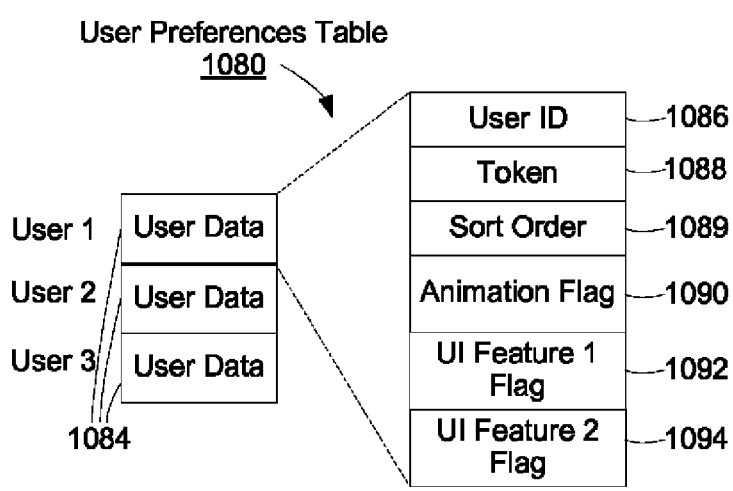

FIG. 10C is a diagram illustrating a data structure for user preferences, in accordance with some embodiments. As described above, a server computer 900 (FIG. 9) may store user preference information in user preferences database 926. The user preference information may be stored in a data structure, such as a table data structure 1080. User preferences table 1080 contains user data 1084 (e.g., in a row or record of the table 1080) for each user. The user data 1084 optionally includes a user ID 1086 (which may be implied by the location of the user data 1084 in the user preferences table 1080), and a token 1088 used by server 900 to authenticate requests from the user. In some embodiments, the token 1088 is generated using a random or pseudo-random number generator or function, and is of sufficient length that it would be impractical to guess or independently replicate the token.

The user data optionally may include one or more additional fields 1089, 1090, 1092, and/or 1094. For example, the user data optionally may include a sort order flag 1089, for specifying the order in which to display content items on a user interface, such as user interface 302 (FIG. 3A). For example, content items may be displayed in chronological order or according to a ranking based on predefined criteria (e.g., the quantity and/or quality of the content in the content items, as well as the recency of the content items). The user data may further include an animation flag 1090 to indicate whether or not to display animations on the user interface. The user data may include user interface feature flags or parameter values (1092, 1094) to specify other user interface characteristics associated with the user. For example, user interface feature flags may be used to specify the formatting and color of a user interface. In an embodiment, users may set the sort order flag, the animation flag and user interface feature flags via menus accessible from the user interface (not shown).

The feed content table 1000 and user subscription table 1050, or portions of these tables, may be stored using sparse table storage mechanisms, since large portions of the user data in these tables may be empty or set to default values.

FIG. 10D is a diagram illustrating an example 1025 of a user subscription table, such as user subscription table 1050 (FIG. 10B), in accordance with some embodiments. As explained above, user subscription table 1050 includes rows for each user known to the system and columns for each content stream known to the system, including both real and virtual content streams. In the example of user subscription table 1025, columns 1030 and 1032 are associated with real content streams, corresponding to streams from publication sources at well-defined network locations. Specifically, stream 1 (1030) is available at a network location indicated by URL1 and stream 2 (1032) is available at a network location indicated by URL2. In an embodiment, the URL's associated with real streams are used as feed ID's and are listed in row 1040 of user subscription table 1025. The check mark under stream 1 (1030) for user 3 (1046) indicates that user 3 has subscribed to stream 1.

Columns 1034, 1036 and 1038 are associated with virtual content streams, defined as streams derived from one or more other content streams. For example, user 1 (1042) has subscribed to streams 1 (1030) and 2 (1032) and assigned the label "tech" to both streams, as indicated by the check mark and text "label:tech" at the intersection of row 1042 with columns 1030 and 1032. User 1 thereby created stream 3 (1034), a virtual stream. In some embodiments, a respective virtual stream is given a feed ID that includes a user name or identifier and a label assigned by a respective user (e.g., the feed ID may have the form "user#:label"). Examples of such feed ID's are listed in row 1040 of FIG. 10D. In this example, stream 3 has the feed ID "User1:tech." Because the feed ID of a respective virtual stream includes the user name or identifier of the user who defined the virtual stream, multiple users may use the same label without conflict. For example, user 25 (row not shown) has assigned the label "tech" to one or more streams, resulting in stream 5 (1038) with feed ID "User25:tech".

Some virtual streams may correspond to (or may include) individual content items on one or more content feeds that have been labeled by a respective user. For example, a user (e.g., "user99" may mark or label specific content feed items as "favorite" items, or the user may assign a user-specified label (e.g., "best" or "reviews") to specific feed items. If the set of user labeled items is made available for subscription by others, the user-labeled items become a virtual stream that is assigned a stream identifier, such as "user99:best". This virtual stream is assigned a column in the user subscription table 1025 and subscription and user labeling information for the virtual stream is stored in this column.

Check marks in column 1034 associated with stream 3 indicate which other users have subscribed to stream 3. In this example, user 2 (1044) has subscribed to stream 3 and assigned the label "friends" to it. User 2 also has assigned the label "friends" to stream 5 (1038), created by user 25. User 2 thereby created stream 4 (1036), which has feed ID "User2:friends". Stream 4 (1036) thus is a virtual stream comprising other virtual streams (stream 3 and stream 5), demonstrating that multiple levels of recursion are allowed for virtual streams. User 3 (1046) has subscribed to stream 4 (1036). If user 3 desired, he could label stream 4, thereby creating another virtual stream with an additional level of recursion, and another user could subscribe to that virtual stream.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of serving content, comprising:
   at a server:
      providing to a first client a plurality of content items from a content feed for display in a first webpage at the first client;
      receiving information identifying one or more content items of the plurality of content items, wherein the one or more content items have been individually selected by a first user at the first client; and
      providing an executable script to the first client for display in the first webpage, the executable script being configured for copying and pasting into a second webpage distinct from the first webpage and for causing a respective client, when rendering the second webpage, to display or list the selected one or more content items.

2. The computer-implemented method of claim 1, wherein the second webpage is downloaded from a host and displayed at a second client associated with a second user.

3. The computer-implemented method of claim 1, wherein the executable script is written in the JAVASCRIPT® scripting language, ECMASCRIPT, or the VBSCRIPT™ scripting language.

4. The computer-implemented method of claim 1, wherein the first webpage is a clip creation webpage, the method further comprising:
   receiving a request corresponding to selection by the first user of a link corresponding to the clip creation webpage; and
   transmitting the clip creation webpage to the first client.

5. A computer-implemented method of displaying content, comprising:
   at a first client:
      receiving, from a server, a plurality of content items from a content feed for display in a first webpage at the first client;
      detecting individual selection of one or more content items of the plurality of content items;
      requesting an executable script containing instructions for displaying or listing the one or more content items;
      receiving the requested executable script;
      displaying the requested executable script in the first webpage; and
      in accordance with copy and paste instructions from a user, incorporating the requested executable script into a second webpage distinct from the first webpage, wherein the requested executable script is configured to instruct the second webpage to display or list the selected one or more content items.

6. The computer-implemented method of claim 5, further including:
   uploading the second webpage to a host, for serving to clients, including clients other than the first client.

7. The computer-implemented method of claim 6, wherein, when the second webpage is served from the host to the respective clients, the second webpage displays or lists the selected one or more content items.

8. The computer-implemented method of claim 5, wherein the executable script is written in the JAVASCRIPT® scripting language, ECMASCRIPT, or the VBSCRIPT™ scripting language.

9. A system for serving content, comprising:
one or more processors; and
memory storing one or more programs configured for execution by the one or more processors, the one or more programs comprising:
instructions for providing to a first client a plurality of content items from a content feed for display in a first webpage at the first client;
instructions for receiving information identifying one or more content items of the plurality of content items, wherein the one or more content items have been individually selected by a first user at the first client; and
instructions for providing an executable script to the first client for display in the first webpage, the executable script being configured for copying and pasting into a second webpage distinct from the first webpage and for causing a respective client, when rendering the second webpage, to display or list the selected one or more content items.

10. The system of claim 9, wherein the first webpage is a clip creation webpage, the one or more programs further comprising:
instructions for receiving a request corresponding to selection by the first user of a link corresponding to the clip creation webpage; and
instructions for transmitting the clip creation webpage to the first client.

11. A first client system for displaying content, the first client system comprising:
one or more processors; and
memory storing one or more programs configured for execution by the one or more processors, the one or more programs comprising:
instructions for receiving, from a server, a plurality of content items from a content feed for display in a first webpage;
instructions for detecting individual selection of one or more content items of the plurality of content items;
instructions for requesting an executable script containing instructions for displaying or listing the one or more content items;
instructions for receiving the requested executable script; and
instructions for displaying the requested executable script in the first webpage;
wherein the requested executable script, when incorporated into a second webpage distinct from the first webpage in accordance with copy and paste instructions from a user, is configured to instruct the second webpage to display or list the selected one or more content items.

12. The system of claim 11, the one or more programs further including:
instructions for uploading the second webpage to a host, for serving to clients, including clients other than the first client.

13. A non-transitory computer readable storage medium storing one or more programs configured to be executed by a computer system, the one or more programs comprising:
instructions for providing to a first client a plurality of content items from a content feed for display in a first webpage at the first client;
instructions for receiving information identifying one or more content items of the plurality of content items, wherein the one or more content items have been individually selected by a first user at the first client; and
instructions for providing an executable script to the first client for display in the first webpage, the executable script being configured for copying and pasting into a second webpage distinct from the first webpage and for causing a respective client, when rendering the second webpage, to display or list the selected one or more content items.

14. The non-transitory computer readable storage medium of claim 13, wherein the first webpage is a clip creation webpage, the one or more programs further comprising:
instructions for receiving a request corresponding to selection by the first user of a link corresponding to the clip creation webpage; and
instructions for transmitting the clip creation webpage to the first client.

15. A non-transitory computer readable storage medium storing one or more programs configured to be executed by a computer system, the one or more programs comprising:
instructions for receiving, from a server, a plurality of content items from a content feed for display in a first webpage;
instructions for detecting individual selection of one or more content items of the plurality of content items;
instructions for requesting an executable script containing instructions for displaying or listing the one or more content items;
instructions for receiving the requested executable script; and
instructions for displaying the requested executable script in the first webpage;
wherein the requested executable script, when incorporated into a second webpage distinct from the first webpage in accordance with copy and paste instructions from a user, is configured to instruct a respective client, when displaying the second webpage, to display or list the selected one or more content items.

16. The non-transitory computer readable storage medium of claim 15, the one or more programs further including:
instructions for uploading the second webpage to a host, for serving to clients, including clients other than the first client.

* * * * *